United States Patent
Chen et al.

(10) Patent No.: US 11,683,734 B2
(45) Date of Patent: Jun. 20, 2023

(54) DOWNLINK MEASUREMENT DESIGN IN NEW RADIO

(71) Applicant: IPLA HOLDINGS INC., New York, NY (US)

(72) Inventors: Wei Chen, San Diego, CA (US); Pascal M. Adjakple, Great Neck, NY (US); Joseph M. Murray, Schwenksville, PA (US); Allan Y. Tsai, Boonton, NJ (US); Lakshmi R. Iyer, King of Prussia, PA (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

(21) Appl. No.: 17/950,145

(22) Filed: Sep. 22, 2022

(65) Prior Publication Data
US 2023/0033917 A1 Feb. 2, 2023

Related U.S. Application Data

(63) Continuation of application No. 17/325,566, filed on May 20, 2021, now Pat. No. 11,510,119, which is a
(Continued)

(51) Int. Cl.
*H04W 36/00* (2009.01)
*H04W 76/27* (2018.01)
(Continued)

(52) U.S. Cl.
CPC ....... *H04W 36/0085* (2018.08); *H04L 1/0026* (2013.01); *H04L 5/0051* (2013.01);
(Continued)

(58) Field of Classification Search
CPC . H04W 36/0085; H04W 76/27; H04W 36/08; H04W 56/001; H04W 72/046; H04L 1/0026; H04L 5/0051
See application file for complete search history.

(56) References Cited

U.S. PATENT DOCUMENTS

| 2013/0322273 A1 | 12/2013 | Etemad et al. |
| 2016/0150435 A1 | 5/2016 | Baek et al. |

(Continued)

FOREIGN PATENT DOCUMENTS

| CN | 103370963 A | 10/2013 |
| CN | 105874849 A | 8/2016 |

(Continued)

OTHER PUBLICATIONS

3GPP TR 38 804 V1 0.0, "3rd Generation Partnership Project; Technical Specification Group Radio Access Network; Study on New Radio Access Technology; Radio Interface Protocol Aspects (Release 14)", Mar. 2017, 56 pages.
(Continued)

*Primary Examiner* — Natasha W Cosme
(74) *Attorney, Agent, or Firm* — Xsensus LLP

(57) ABSTRACT

Measurement modeling and filtering may include configurable cell quality derivation method is used for multi-beam based NR networks; a common measurement model that considers different characteristics of the two measurement signals, NR synchronization signal and additional reference signal; and a multi-level measurement filtering approach that handles different mobility scenarios in an NR network. Measurement configuration and procedures may include a measurement gap design during which UE may use to perform measurements for beam sweeping based NR networks; a group of triggering events that may be used to trigger UE mobility management in an NR network; a content format that may be used for the transmission of UE measurement report; a measurement object design (the object on which a UE may perform the measurements) to reduce UE measurement overhead and cost; and a downlink measurement based inter-cell handover procedure that may be used in an NR network.

18 Claims, 25 Drawing Sheets

Related U.S. Application Data continuation of application No. 16/495,521, filed as application No. PCT/US2018/024031 on Mar. 23, 2018, now Pat. No. 11,044,650.

(60) Provisional application No. 62/520,017, filed on Jun. 15, 2017, provisional application No. 62/475,360, filed on Mar. 23, 2017.

(51) Int. Cl.
    *H04W 36/08*     (2009.01)
    *H04W 56/00*     (2009.01)
    *H04L 1/00*     (2006.01)
    *H04L 5/00*     (2006.01)
    *H04W 72/044*     (2023.01)

(52) U.S. Cl.
    CPC ......... *H04W 36/08* (2013.01); *H04W 56/001* (2013.01); *H04W 72/046* (2013.01); *H04W 76/27* (2018.02)

(56) References Cited

U.S. PATENT DOCUMENTS

| | | |
|---|---|---|
| 2016/0337916 A1 | 11/2016 | Deenoo et al. |
| 2018/0007577 A1 | 1/2018 | Guo et al. |
| 2019/0342807 A1 | 11/2019 | Harada et al. |

FOREIGN PATENT DOCUMENTS

| | | |
|---|---|---|
| EP | 3 139 658 A1 | 3/2017 |
| WO | 2015/080645 A1 | 6/2015 |
| WO | 2017/006470 A1 | 1/2017 |
| WO | 2018/034698 A1 | 2/2018 |

OTHER PUBLICATIONS

3GPP TR 38.913 V0.2.0, "3rd Generation Partnership Project; Technical Specification Group Radio Access network; Study on Scenarios and Requirements for Next Generation Access Technologies; (Release 14)", Feb. 2016, 19 pages.

3GPP TS 36.133 V14.2.0, "3rd Generation Partnership Project; Technical Specification Group Radio Access Network; Evolved Universal Terrestrial Radio Access (E-UTRA); Requirements for support of radio resource management (Release 14)", Dec. 2016, 2304 pages.

3GPP TS 36.300 V 14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN; Overall description; Stage 2 (Release 14)", Mar. 2017, 330 pages.

3GPP TS 36.331 V14.1.0, "3rd Generation Partnership Project; Technical Specification Group Radio Access Network; Evolved Universal Terrestrial Radio Access (E-UTRA); Radio Resource Control (RRC); Protocol specification (Release 14)", Dec. 2016, 654 pages.

3GPP TSG RAN WG1 #85, R1-164013, Samsung, "Framework for Beamformed Access", May 2016, 4 pages.

3GPP TSG RAN WG1 NR WG1 NR Meeting R1-1703184, Nokia et al., "On QCL Framework and Configurations in NR" Feb. 2017, 3 pages.

3GPP TSG RAN WG2 Meeting #97 R2-1701504, Sony, "Cell quality measurement evaluation using multiple beams (Was R2-1700141)", Feb. 2017, 5 pages.

3GPP TSG-RAN WG2 #97 Tdoc R2-1700856, Ericsson, "RRM measurements in Connected based on IDLE RS and additional RS", Feb. 2017, 6 pages.

3GPP TSG-RAN WG2 Meeting #96 R2-167836, ZTE, "Consideration on the RRM Measurement for NR", Nov. 2016, 6 pages.

3GPP TSG-RAN WG2 Meeting #97 R2-1701264, LG Electronics Inc., "RRM measurement", Feb. 2017, 3 pages.

3GPP TSG-RAN WG2 Meeting #97 R2-1701293, Samsung, "Measurement gap for NR", Feb. 2017, 3 pages.

Nokia, Alcatel-Lucent Shanghai Bell, on RRM Measurement Reporting in NR[online], 3GPP TSG RAN WG2 #97, 3GPP, Feb. 17, 2017 R2-1701573, [Sep. 2017, 2021], Internet <URL:http//www.3gpp.org/flp/tsg_ran/WG2_RL2/TSgr2_97/Docs/R2-1701573.zip>.

3GPP TSG-RAN WG2 Meeting #96 Reno, Nevada, USA, Nov. 14-18, 2016, Ericsson, "Filtering of connected mode RSs", R2-168729, 7 pp.

3GPP TSG-RAN WG2 Meeting#99bis, Prague, Czech Republic, Oct. 9-13, 2017, Lenovo, Motorola Mobility "Demerits of using Slice information for Cell selection", R2-1710163, 1 page.

3GPP TSG-RAN WG2 Meeting NR AH Spokane, WA, USA, Jan. 17-19, 2017, MediaTek Inc., "Cell Quality Derivation and Measurement Events for NR Mobility", R2-1700273, 4 pp.

3GPP TSG-RAN WG2 NR Ad Hoc Spokane, USA, Jan. 17-19, 2017, CMCC, "How to derive a cell quality for RRM measurement", R2-1700312, 5 pp.

Samsung, "RRM Measurement Model in NR" [online], 3GPP TSGRAN WG2 #97, 3GPP, Feb. 17, 2017, R2-1701998.

Sony, "Cell quality measurementevaluation using multiple beams", 3GPP TSG RANWG2 adhoc_2017_01_NR, 3GPP, Jan. 19, 2017, R2-1700141.

| Cell ID | TRP ID | TRP's beam ID | UE's beam ID | RSSI/RSRP/RSRQ... |
|---|---|---|---|---|
| M | X | 1 | 2 | Value(2,1) |
| | | 2 | 2 | Value(2,2) |
| | | ... | 2 | ... |
| | | N | 2 | Value(2,N) |

Layer 1 filter measurement samples input of additional RS

| Cell ID | UE's beam ID | SS-Block RSSI/RSRP/RSRQ... |
|---|---|---|
| M | 2 | Value(2) |

Layer 1 filter measurement samples input of NR-SS

Fig. 9

DOWNLINK MEASUREMENT DESIGN IN NEW RADIO

CROSS-REFERENCE TO RELATED APPLICATIONS

This application is a continuation of U.S. patent application Ser. No. 17/325,566 filed May 20, 2021, which is a continuation of U.S. patent application Ser. No. 16/495,521 filed Sep. 19, 2019 (now U.S. Pat. No. 11,044,650) which is the National Stage Application of International Patent Application No. PCT/US2018/024031 filed Mar. 23, 2018, which claims the benefit of U.S. Provisional Patent Application No. 62/475,360 riled Mar. 23, 2017 and U.S. Provisional Patent Application No. 62/520,0175 filed Jun. 15, 2017 the disclosures of each are hereby incorporated by reference as if set forth in their entirety herein.

BACKGROUND

This disclosure relates to wireless communications using multiple beams, such as those described in 3GPP TS 36.300 and TS 36.331.

SUMMARY

A wireless apparatus, such as a user equipment (UE) receives beam measurement configuration information from another network node, such as a gNB, to facilitate adaptation to changing multi-beam environments. The configuration may pertain to beam-specific measurements of a plurality of beams of one or more wireless cells. The apparatus may then perform beam-specific measurements according to the configuration and derive, based on the beam-specific measurements, a cell quality.

The beam-specific measurements may include, for example, measuring a reference signal received power, a reference signal received quality, or a signal-to-interference-plus-noise ratio. The plurality of beams may include a new radio synchronization signal or a channel state information-reference signal, for example.

The configuration may include various information pertaining to how many beams are measured, when they are measured, and how they are assessed. For example, the configuration may indicate a maximum or minimum number of beams to be measured, and criteria for inclusion of beams in the measurement group. Alternatively, a cell quality assessment may be determined by the character of a single "best" beam, for example, where "best" may be stipulated by the configuration as being the strongest or highest quality signal, or a composite measurement based on a combination of signal strength and quality, for instance.

Such beam-specific measurements may be performed automatically or conditionally on the beams of a primary cell, a secondary cell, or all neighbor cells of the apparatus. For example, measurement of the beams of one or more neighbor cells may be performed only if the cell quality of a primary cell is below a threshold.

A cell may be arranged to provide a gap pattern to facilitate measurement by the apparatus of certain signals, e.g., reference signals, in absence of interference from other signals, e.g., download and upload traffic. The gap pattern may be included in the measurement configuration information. The gap pattern may take a variety forms. For example, the set of measurement gaps may be a pattern of gaps in burst series of a serving cell including offsets between gaps that are variable amount or are incremented for each subsequent gap, or both.

The apparatus may be arranged to provide measurement reports back to the server or TRP, for example, based on various triggering events. The form and content of the reports, as well as the triggering events, may be adjusted via the measurement configuration information, for example.

A second measurement configuration may be sent to the apparatus on the basis of a measurement report. For example, the second configuration may adjust the gap pattern, which beams are measured, which cells are measured, the criteria for evaluation of beams, measurement or reporting triggering events, or the method for deriving an assessment of cell quality.

A measurement report may include information pertaining to any particular beam or group of beams. For example, information regarding a new radio synchronization signal or a channel state information-reference signal, or both, may be included.

A measurement report may include a beam index, for example, or a time index of a synchronization signal block. A beam index may be ordered according to a strength of a measurement quantity. Reported beam measurements may also include the beam measurement quantity.

The apparatus may be arranged to receive a handover command including a random access channel configuration, wherein the random access channel configuration comprising physical random access channel resources associated with one or more of the beams included in the second measurement report.

Using such techniques, a configurable cell quality derivation method for multi-beam based NR networks may be achieved, as well as a common measurement model that considers different characteristics of the NR synchronization signal and an additional reference signal, for example. This allows a multi-level measurement filtering approach that handles different mobility scenarios in an NR network.

Similarly, a measurement gap design during which UE may be used to perform measurements for beam sweeping based NR networks. An NR MeasGapConfig IE may be used to signal the NR gap pattern configuration. A group of triggering events may be used to trigger UE mobility management in an NR network. An NR MeasurementReport message and MeasResults IE may be used to report NR measurement results, for example. A measurement object design, for an object on which a UE may perform the measurements, may be used to reduce UE measurement overhead and cost. An NR MeasConfig IE may be used to signal the measurement configuration. A downlink measurement based inter-cell handover procedure may be used in an NR network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 9 illustrates example measurement sample inputs of a Layer 1 filter for NR-SS and an additional RS.

DETAILED DESCRIPTION

TABLE 1

| | Abbreviations |
|---|---|
| ARQ | Automatic Repeat Request |
| AS | Access Stratum |
| CMAS | Commercial Mobile Alert System |
| CN | Core Network |
| C-RNTI | Cell Radio-Network Temporary Identifier |
| CSI-RS | Channel State Information-Reference Signals |
| DL | Downlink |
| DL-SCH | Downlink Shared Channel |
| DRX | Discontinuous Reception |
| EAB | Extended Access Barring |
| eMBB | enhanced Mobile Broadband |
| eNB | Evolved Node B |
| ETWS | Earthquake and Tsunami Warning System |
| E-UTRA | Evolved Universal Terrestrial Radio Access |
| E-UTRAN | Evolved Universal Terrestrial Radio Access Network |
| FDD | Frequency Division Duplex |
| GERAN | GSM EDGE Radio Access Network |
| GSM | Global System for Mobile communications |
| HARQ | Hybrid ARQ |
| HF-NR | High Frequency-New Radio |
| HNB | Home eNB |
| IE | Information Element |
| KPI | Key Performance Indicators |
| LTE | Long term Evolution |
| MAC | Medium Access Control |
| MBMS | Multimedia Broadcast Multicast Service |
| MCL | Maximum Coupling Loss |
| MIB | Master Information Block |
| MTC | Machine-Type Communications |
| mMTC | Massive Machine Type Communication |
| NAS | Non-access Stratum |
| NR | New Radio |
| NR-SS | New Radio Synchronization Signal |
| PCell | Primary Cell |
| OFDM | Orthogonal Frequency Division Multiplexing |
| PC | Paging Cycle |
| PCCH | Physical Common Control Channel |
| PCell | Primary Cell |
| PDCCH | Physical Downlink Control Channel |
| PF | Paging Frame |
| PHY | Physical Layer |
| PO | Paging Occasion |
| PRACH | Physical Random Access Channel |
| PRB | Physical Resource Block |
| P-RNTI | Paging Radio-Network Temporary Identifier |
| PSCell | Primary Secondary Cell |
| QoS | Quality of Service |
| RACH | Random Access Channel |
| RAN | Radio Access Network |
| RAR | Random Access Response |
| RAT | Radio Access Technology |
| RRC | Radio Resource Control |
| RSRP | Reference Signal Received Power |
| RSRQ | Reference Signal Received Quality |
| SAI | Service Area Identities |
| SC-PTM | Single Cell Point to Multipoint |
| SFN | System Frame Number |
| SI | System Information |
| SIB | System Information Block |
| SINR | Signal-To-Interference-Plus-Noise Ratio |
| SMARTER | Feasibility Study on New Services and Markets Technology |
| SS | Synchronization Signal |
| sTAG | Secondary Timing Advance Group |
| TRP | Transmission and Reception Point |
| UE | User Equipment |
| UL | Uplink |
| UL-SCH | Uplink Shared Channel |
| UTRAN | Universal Terrestrial Radio Access Network |
| URLLC | Ultra-Reliable and Low Latency Communications |
| UTC | Coordinated Universal Time |

Figure 1:
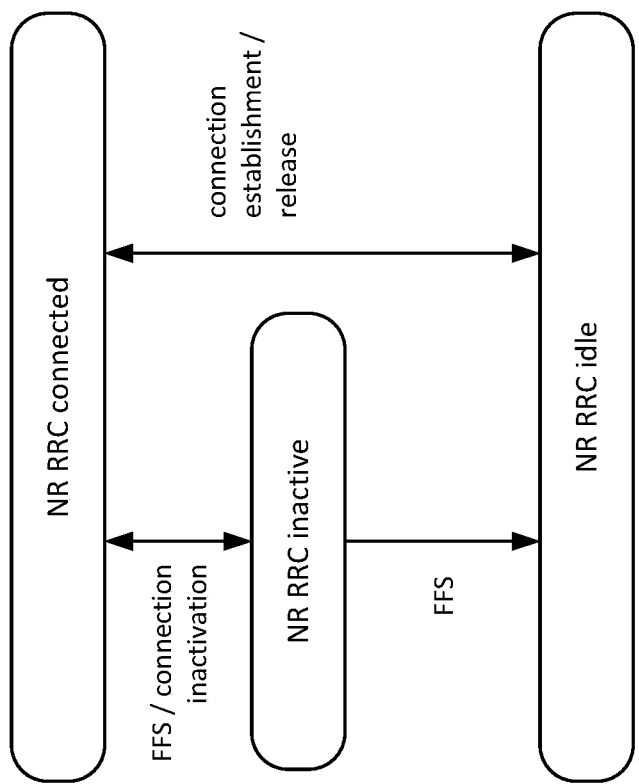
FIG. 1 is a state diagram that shows an example user equipment (UE) state machine and state transitions.

The 3GPP TR 38.804 Study on New Radio Access Technology Radio Interface Protocol Aspects, Release 14, V 1.0.0, describes a number of RRC protocol states, which are illustrated in FIG. 1.

An RRC_IDLE state includes cell re-selection mobility, with paging is initiated by core network. The paging area is managed by the core network.

An RRC_INACTIVE state includes cell re-selection mobility. A core network—NR RAN connection for both control and user planes is been established for the UE. The UE AS context is stored in at least one gNB and the UE. Paging is initiated by the NR RAN. RAN-based notification area is managed by NR RAN. The NR RAN knows the RAN-based notification area to which the UE belongs.

In an RRC_CONNECTED state, the UE has an NR RRC connection. The UE has an AS context in NR. NR RAN knows the cell which the UE belongs to. Transfer of unicast data to/from the UE. Network controlled mobility, e.g., handover within NR and to/from the E-UTRAN.

FIG. 1 further shows supported state transitions between these RRC states. A transition from RRC_IDLE to RRC_CONNECTED may follow, for example, a "connection setup" procedure (e.g., request, setup, complete). A transition from RRC_CONNECTED to RRC_IDLE, may follow, for example, a "connection release" procedure. A transition from RRC_CONNECTED to RRC_INACTIVE, may follow, for example, a "connection inactivation" procedure. A transition from RRC_INACTIVE to RRC_CONNECTED, may follow, for example, a "connection activation" procedure.

Figure 2:
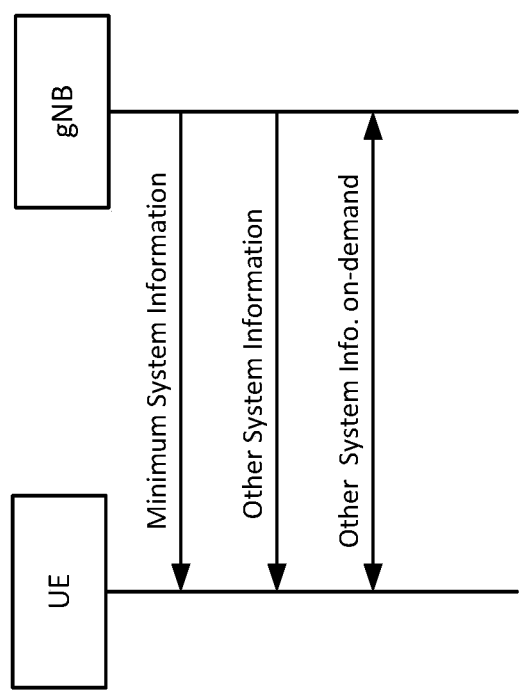
FIG. 2 is a call flow diagram that shows an example high level concept of on-demand SI provisioning.

System information is divided into "Minimum SI" and "Other SI". Minimum SI is always present and broadcast periodically. The Minimum SI comprises basic information required for initial access to a cell, and information for acquiring any Other SI broadcast periodically, or provisioned on an on-demand basis, e.g., scheduling information. Other SI encompasses system information not broadcast in the Minimum SI. The Other SI is optional, and may either be broadcast separately, for example, or provisioned in dedicated signaling, either triggered by the network or upon request from the UE as illustrated in FIG. 2.

Figure 3:
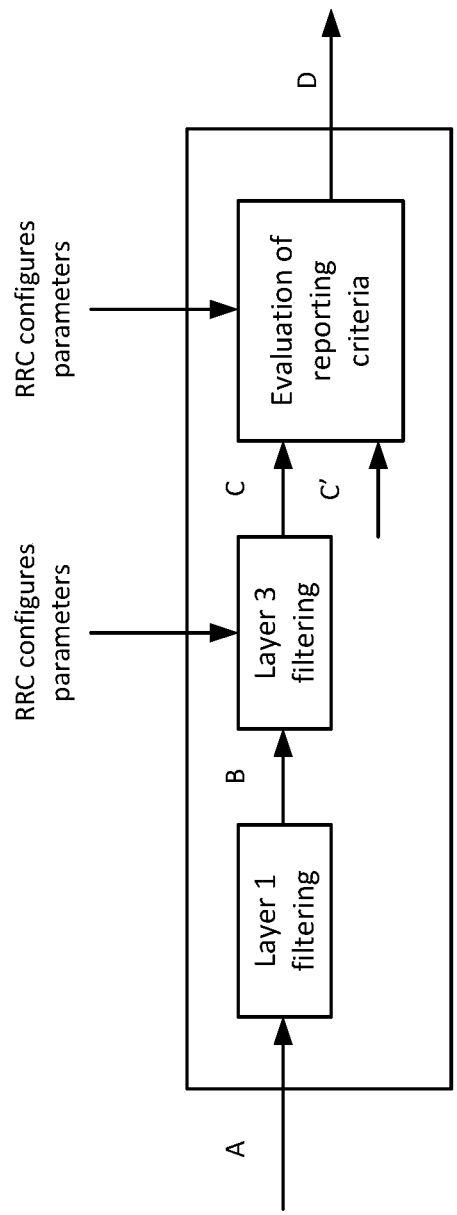
FIG. 3 is a block diagram that shows an example a measurement model adopted in LTE.

Section 10.6 in 3GPP TS 36.300 defines the measurement model currently used in LTE. This model is illustrated in FIG. 3. The signals at Point A are measurements (samples) internal to the physical layer. Layer 1 filtering is internal filtering of the inputs measured at Point A. The exact manner in which observations are filtered and processed to produce measurements, e.g., in the physical layer, is implementation dependent. Layer 1 filtering is not constrained by the LTE standard.

The signals at Point B are measurements reported by Layer 1 to Layer 3 after Layer 1 filtering.

Layer 3 filtering is performed on the measurements provided at Point B. The behavior of the Layer 3 filters are standardized and the configuration of the Layer 3 filters is provided by RRC signaling. The filtering reporting period at Point C equals one measurement period at B.

The signals at Point C are measurements after processing in the Layer 3 filter. The reporting rate is identical to the reporting rate at Point B. These measurements are used as input for one or more evaluation of reporting criteria.

Reporting criteria are evaluated to check whether any measurement reporting is necessary at Point D. The evaluation may be based on more than one flow of measurements at reference Point C, e.g., to compare between different measurements. This is illustrated in FIG. 3 by the inputs at Points C and C'. The UE may evaluate the reporting criteria at least every time a new measurement result is reported at Point C or C'. The reporting criteria are standardized and the configuration is provided by RRC signaling for UE measurements.

The signals are Point D include measurement report information, such as messages, sent on the radio interface.

Layer 1 filtering may introduce a certain level of measurement averaging. Exactly how and when the UE performs the required measurements will be implementation specific up to the output at Point B fulfils the performance requirements set in 3GPP TS 36.133. Layer 3 filtering and parameters used are specified in 3GPP TS 36.331, and do not introduce any delay in the sample availability between Points B and C. The measurement at Points C and C' are the input used in the event evaluation.

As specified in 3GPP TS 36.331, in LTE the UE reports measurement information in accordance with the measurement configuration as provided by the E-UTRAN. The E-UTRAN provides the measurement configuration applicable for a UE in RRC_CONNECTED by means of dedicated signaling, e.g., using the RRCConnectionReconfiguration or RRCConnectionResume message.

The UE may be requested to perform the following types of measurements: intra-frequency measurements, e.g., measurements at the downlink carrier frequencies of the serving cells; inter-frequency measurements, e.g., measurements at frequencies that differ from any of the downlink carrier frequencies of the serving cells; inter-RAT measurements of UTRA frequencies; inter-RAT measurements of GERAN frequencies; and inter-RAT measurements of CDMA2000 HRPD or CDMA2000 1×RTT or WLAN frequencies.

The measurement configuration may include a number of parameters, such as measurement objects. Measurement objects are objects on which the UE may perform the measurements. For intra-frequency and inter-frequency measurements, a measurement object may be a single E-UTRA carrier frequency. Associated with this carrier frequency, the E-UTRAN may configure a list of cell specific offsets, e.g., a list of 'blacklisted' cells and a list of 'whitelisted' cells. Blacklisted cells are not considered in event evaluation or measurement reporting. For inter-RAT WLAN measurements, a measurement object is a set of WLAN identifiers and optionally a set of W LAN frequencies.

Some measurements only concern a single cell, such as measurements used to report neighbouring cell system information, a PCell UE Rx-Tx time difference, or a pair of cells. e.g., SSTD measurements between the PCell and the PSCell.

The measurement configuration parameters may include reporting configurations. The purpose of a measurement report is to transfer measurement results from the UE to the E-UTRAN. The UE may initiate this procedure only after successful security activation. A reporting configuration may include, for example, reporting criteria and reporting format information. A reporting criterion may be a criterion that triggers the UE to send a measurement report, for example. This may be periodical or a single event description, for instance. Reporting format information may include, for example, quantities that the UE includes in the measurement report and associated information, e.g., number of cells to report.

The measurement configuration parameters may include measurement identities, for example, where each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report.

The measurement configuration parameters may include quantity configurations, for example, with one quantity configuration is configured per RAT type. The quantity configuration defines the measurement quantities and associated filtering used for all event evaluation and related reporting of that measurement type. One filter may be configured per measurement quantity, for example.

The measurement configuration parameters may include measurement gaps, e.g., periods that the UE may use to perform measurements where no UL or DL transmissions are scheduled. Table 2 enumerates example gap pattern configurations that may be supported by a UE.

TABLE 2

Gap Pattern Configurations supported by the UE

| Gap Pattern Id | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

The E-UTRAN may, for example, configure a single measurement object for a given frequency, except for the WLAN. In some cases, it is not possible to configure two or more measurement objects for the same frequency with different associated parameters, e.g., with different offsets or blacklists. The E-UTRAN may configure multiple instances of the same event, e.g., by configuring two reporting configurations with different thresholds.

The UE may maintain a single measurement object list, a single reporting configuration list, and a single measurement identities list. The measurement object list includes measurement objects that are specified per RAT type. The measurement object list and may include intra-frequency objects such as objects corresponding to the serving frequencies. The measurement object list and may include inter-frequency objects, and inter-RAT objects. The reporting configuration list may include E-UTRA and inter-RAT reporting configurations. Any measurement object may be linked to any reporting configuration of the same RAT type. Some reporting configurations may not be linked to a measurement object. Likewise, some measurement objects may not be linked to a reporting configuration.

The measurement procedures may draw distinctions between serving cells, listed cells, and detected cells. Serving cells may include the PCell and one or more SCells, if configured for a UE supporting CA. Listed cells are cells listed within the measurement objects or, for inter-RAT WLAN, the WLANs matching the WLAN identifiers configured in the measurement object or the WLAN the UE is connected to. Detected cells are cells that are not listed within the measurement objects but are detected by the UE on the carrier frequencies indicated by the measurement objects.

As specified in TS 36.300, measurements to be performed by a LTE UE for intra/inter-frequency mobility may be controlled by E-UTRAN, e.g., using broadcast or dedicated control. In RRC_IDLE state, a UE may follow the measurement parameters defined for cell reselection specified by the E-UTRAN broadcast. The use of dedicated measurement control for RRC_IDLE state is possible through the provision of UE specific priorities. See sub-clause 10.2.4 of TS 36.300. In RRC_CONNECTED state, a UE may follow the measurement configurations specified by RRC directed from the E-UTRAN, e.g., as in UTRAN MEASUREMENT CONTROL.

In RRC_IDLE and RRC_CONNECTED sates, the UE may be configured to monitor one or more UTRA or E-UTRA carriers according to reduced performance requirements as specified in TS 36.133.

For CSI-RS based discovery signals measurements, herein the term "cell" refers to the transmission point of the concerned cell.

Intra-frequency neighbor cell measurements are neighbor cell measurements performed by the UE are intra-frequency measurements when the current and target cell operates on the same carrier frequency. Inter-frequency neighbor cell measurements are neighbor cell measurements performed by the UE are inter-frequency measurements when the neighbor cell operates on a different carrier frequency, compared to the current cell.

Whether a measurement is non-gap-assisted or gap-assisted depends on the UE's capability and the current operating frequency. In non-gap-assisted scenarios, a UE may be able to carry out such measurements without measurement gaps. In gap-assisted scenarios, the UE should not be assumed to be able to carry out such measurements without measurement gaps. The UE determines whether a particular cell measurement needs to be performed in a transmission/reception gap and the scheduler needs to know whether gaps are needed.

Figure 4:
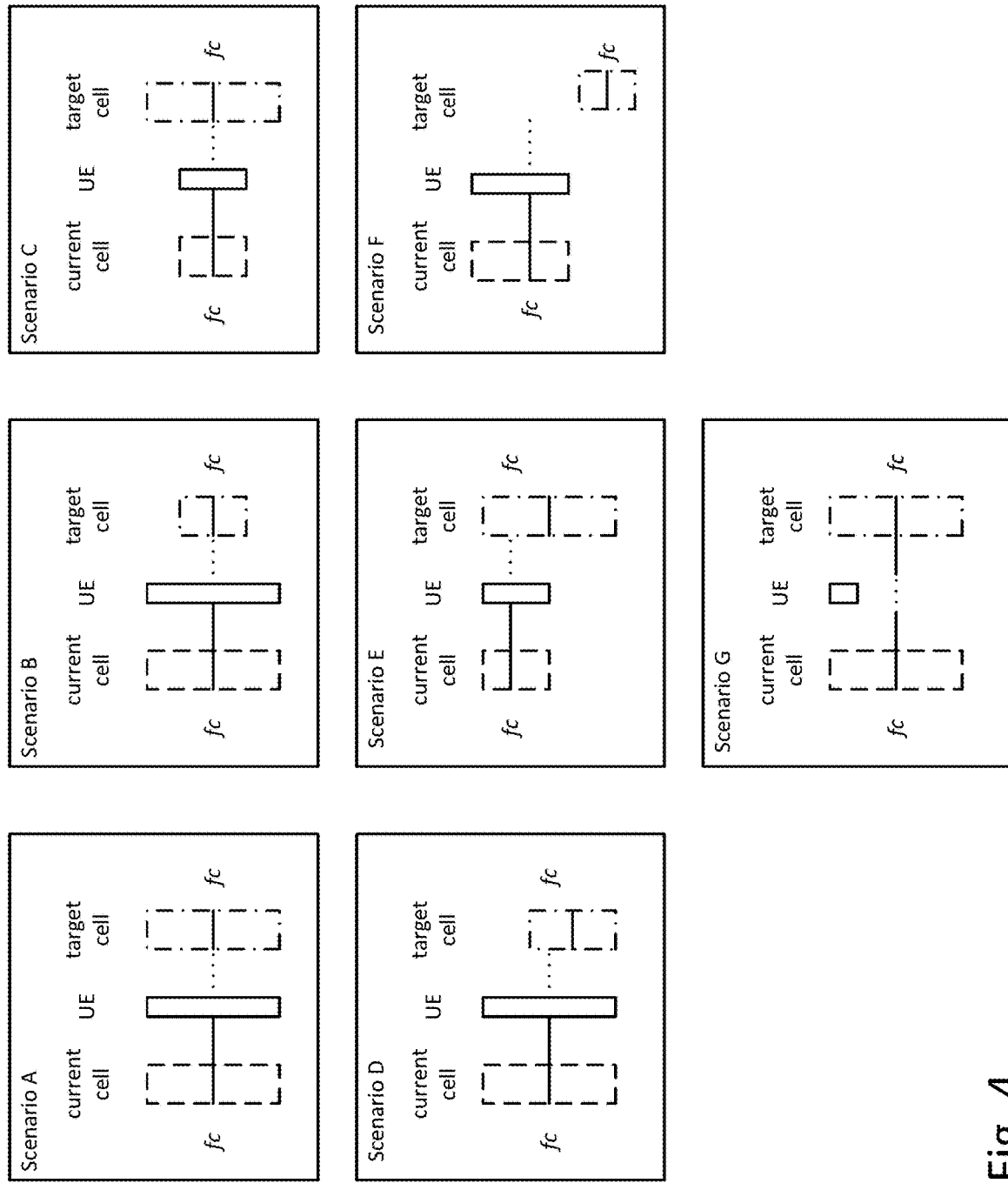
FIG. 4 illustrates a number of example inter-frequency and intra-frequency measurements scenarios.

Many inter-frequency and intra-frequency measurement scenarios are possible, such as the Scenarios A-G of FIG. 4.

In Scenario A of FIG. 4, the same carrier frequency and cell bandwidths are used. This is an intra-frequency scenario without a measurement gap.

In Scenario B, the same carrier frequency is used, but the bandwidth of the target cell smaller than the bandwidth of the current cell. This is an intra-frequency scenario without a measurement gap.

In Scenario C, the same carrier frequency is used, but the bandwidth of the target cell larger than the bandwidth of the current cell. This is an intra-frequency scenario without a measurement gap.

In Scenario D, different carrier frequencies are used, and the bandwidth of the target cell smaller than the bandwidth of the current cell. The bandwidth of the target cell is within bandwidth of the current cell. This is an inter-frequency scenario which uses a measurement.

Scenario E involves different carrier frequencies, where the bandwidth of the target cell larger than the bandwidth of the current cell, and bandwidth of the current cell is within bandwidth of the target cell. This is an inter-frequency scenario using a measurement gap.

In Scenario F, different carrier frequencies are used with and non-overlapping bandwidths. This is an inter-frequency scenario using a measurement gap.

In Scenario G, the same carrier frequency is used, but the operating frequency of the bandwidth reduced low complexity (BL) UE or the UE in Enhanced Coverage is not guaranteed to be aligned with the center frequency of the current cell. This is an intra-frequency scenario, which uses a measurement gap.

Measurement gaps patterns may be configured and activated by RRC.

When CA is configured, the "current cell" may be any serving cell of the configured set of serving cells. For intra-frequency neighbor cell measurements this means that neighbor cell measurements performed by the UE are intra-frequency measurements when one of the serving cells of the configured set and the target cell operates on the same carrier frequency. The UE may be able to carry out such measurements without measurement gaps.

For inter-frequency neighbor cell measurements, neighbor cell measurements performed by the UE are inter-frequency measurements when the neighbor cell operates on a different carrier frequency than any serving cell of the configured set. The UE should not be assumed to be able to carry out such measurements without measurement gaps.

When DC is configured, the configured set of serving cells includes all the cells from MCG and SCG as for CA. The measurement procedure of serving cells belonging to the SeNB may not be impacted due to RLF of SeNB. Further, a common gap for the MeNB and the SeNB may be applied. There is only a single measurement gap configuration for the UE which is controlled and informed by the MeNB. Further, when DC is configured, the UE determines the starting point of the measurement gap based on the SFN, subframe number, and subframe boundaries of the MCG serving cells.

Figure 5:
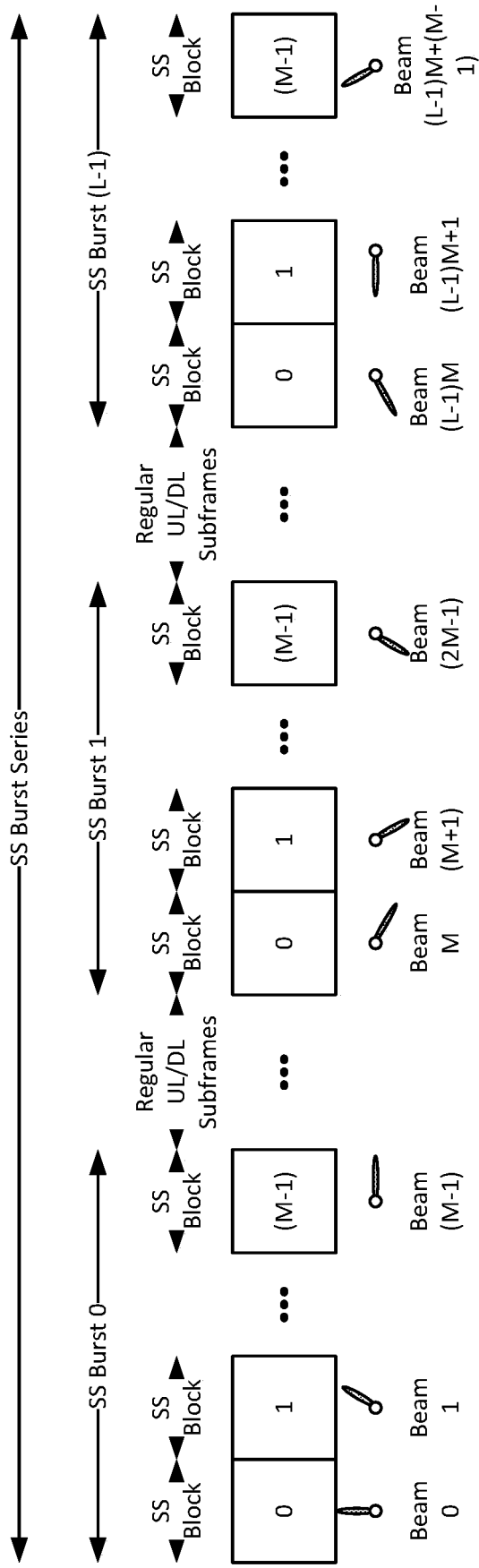
FIG. 5 is a timing diagram that shows an example SS burst series with a single beam transmitted during each SS Block.

In NR, a Synchronization Signal (SS) block may be defined as a unit of beam sweeping time during which the network may transmit synchronization signals to a UE. An SS burst may be defined as a set of 1 or more SS blocks and an SS burst series may be defined as a set of one or more SS bursts. An SS Burst Series is shown in FIG. 5, in this example, the system transmits one beam during each SS block. There are M SS blocks in each SS burst and L SS bursts in the SS burst series.

Currently, 3GPP standardization's efforts are underway to design the framework for beamformed access. The characteristics of the wireless channel at higher frequencies are significantly different from the sub-60 Hz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/beamforming is essential in guaranteeing sufficient signal level at the receiver end. See, e.g., 3GPP R1-164013 Framework for Beamformed Access.

Relying solely on MIMO digital precoding used by digital beamforming to compensate for the additional path-loss in higher frequencies seems not enough to provide similar coverage as below 6 GHz. Thus, the use of analog beamforming for achieving additional gain may be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a three-sector configuration. The limiting factors of the number of concurrent high gain beams include the cost and complexity of the transceiver architecture.

Figure 6:
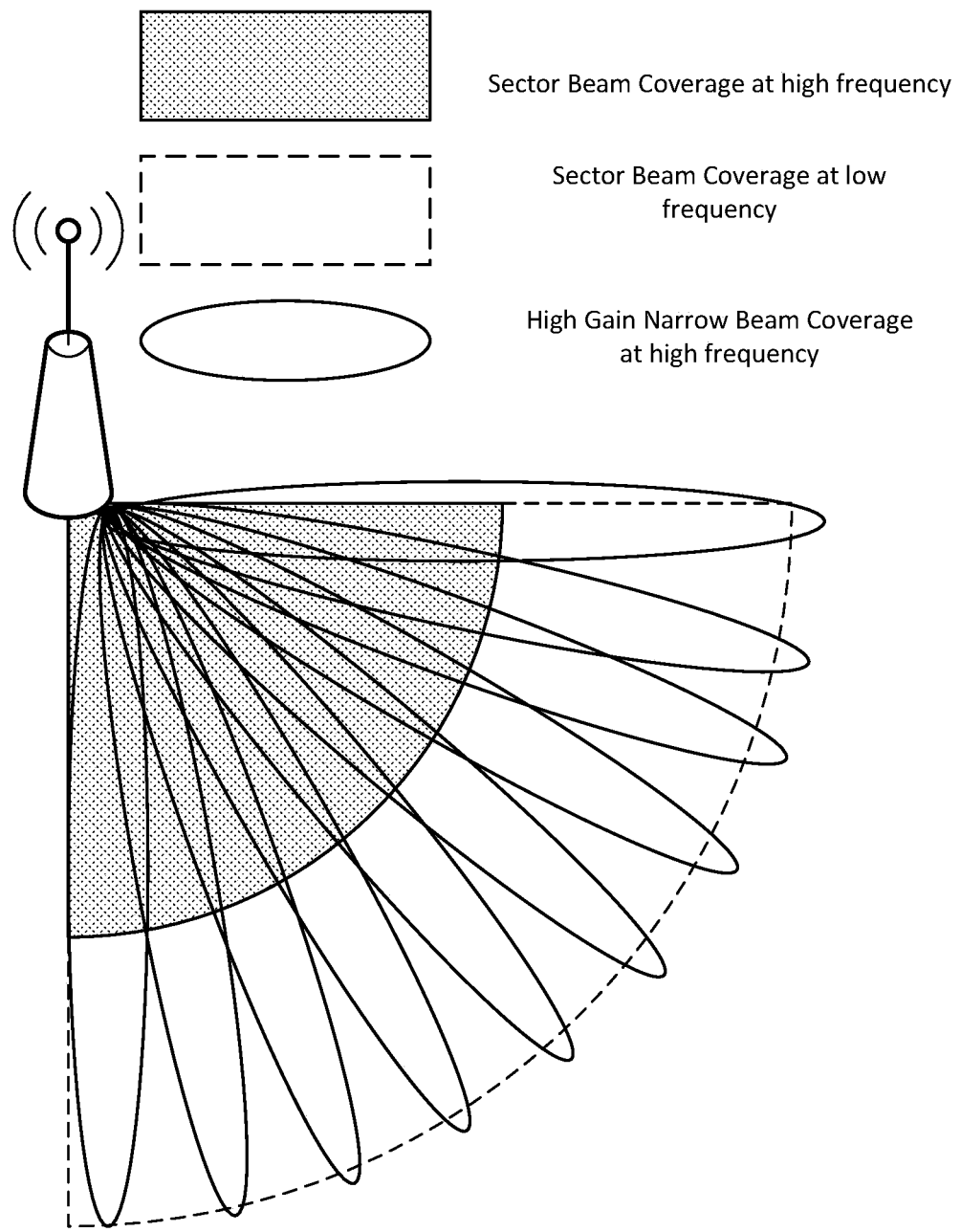
FIG. 6 is a beam diagram that shows an example of cell coverage with sector beams and multiple high gain narrow beams.

Multiple transmissions in time domain with narrow coverage beams steered to cover different serving areas are necessary. Inherently, the analog beam of a subarray may be steered toward a single direction at the time resolution of an OFDM symbol or any appropriate time interval unit defined for the purpose of beam steering across different serving areas within the cell, and hence the number of subarrays determines the number of beam directions and the corresponding coverage on each OFDM symbol or time interval unit defined for the purpose of beams steering. In some literature, the provision of multiple narrow coverage beams for this purpose has been called "beam sweeping". For analog and hybrid beamforming, the beam sweeping seems to be essential to provide the basic coverage in NR. This concept is illustrated in FIG. 6 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is essential to cover the whole coverage areas within a serving cell in NR.

One concept closely related to beam sweeping is the concept of beam pairing which is used to select the best beam pair between a UE and its serving cell, which may be used for control signaling or data transmission. For the downlink transmission, a beam pair will consist of UE RX beam and NR-Node TX beam. For uplink transmission, a beam pair will consist of UE TX beam and NR-Node RX beam.

A related concept is beam training, which may be used for beam refinement. For example, as illustrated in FIG. 6, a coarser sector beamforming may be applied during the beam sweeping and sector beam pairing procedure. A beam training may then follow where for example the antenna weights vector is refined, followed by the pairing of high gain narrow beams between the UE and NR-Node.

In NR, under 3GPP TR 38.804, beam management includes a set of L1/L2 procedures to acquire and maintain a set of one or more TRPs and/or UE beams that may be used for DL and UL transmission/reception, encompassing a least beam determination, measurement, reporting, and sweeping. Beam determinations are made for TRPs or UEs to select of its own Tx/Rx beams. Beam measurement involves TRPs or UEs to measuring characteristics of received beamformed signals. Beam reporting is where the UE to reports information such as a property/quality of beamformed signals based on beam measurement. Beam sweeping: is an operation covering a spatial area, with beams transmitted and/or received during a time interval in a predetermined way.

Several DL L1/L2 beam management procedures may be supported within one or multiple TRPs. Procedure P-1 may be used to enable UE measurement on different TRP Tx beams to support selection of TRP Tx beams/UE Rx beams. For beamforming at a TRP, Procedure P-1 typically includes an intra/inter-TRP Tx beam sweep from a set of different beams. For beamforming at UE, Procedure P-1 typically includes a UE Rx beam sweep from a set of different beams.

Procedure P-2 may be used to enable UE measurement on different TRP Tx beams to change inter/intra-TRP Tx beams from a possibly smaller set of beams for beam refinement than in P-1. P-2 may be a special case of P-1.

Procedure P-3 may be used to enable UE measurement on the same TRP Tx beam to change UE Rx beam in the case UE uses beamforming.

At least network triggered aperiodic beam reporting is supported under P-1, P-2, and P-3 related operations.

For downlink, NR supports beam management with and without beam-related indication. When beam-related indication is provided, information pertaining to UE-side beamforming/receiving procedure used for data reception may be indicated through QCL to UE.

Based on an RS used for beam management transmitted by a TRP, a UE may report information associated with a number, N, of selected Tx beams. TR 38.804 describes aspects of measurement for New Radio Access Technology. For the cell level mobility driven by RRC, the baseline of the RRM measurement framework for DL is the one specified for LTE, including measurement object, measurement ID, and reporting configuration, as specified in TS 36.331. The DL RRM measurement may be performed based on a common framework regardless of network and UE beam configurations, e.g., number of beams. As for the event triggered reporting, at least Events A1 to A6 specified for LTE are to be supported in NR, with potential modifications. Other events may also be studied for NR. Measurement reports may contain at least cell level measurement results.

A UE in RRC_CONNECTED should be able to perform RRM measurements on always on an idle RS, e.g., NR-PSS/SSS, and/or CSI-RS. The gNB should be able to configure RRM measurements via dedicated signaling to be performed on CSI-RS and/or idle RS. The event triggered reporting may be configured for NR-PSS/SSS and for CSI-RS for RRM measurements. At least, Even A1 to A6 may be configured for NR-PSS/SSS.

In multi-beam operations, a UE in RRC_CONNECTED state may measure one or more individual DL beams. The gNB may have the mechanisms to consider the measurement results of those DL beams for handover. This mechanism is useful to trigger inter-gNB handover and to optimize handover ping-pong and failure. The UE should be able to distinguish between the beams from its serving cell and the beams from neighbor cells. The UE should be able to learn whether a beam is coming from its serving cell. Cell level signaling quality for the DL RRM measurement may be derived from multiple beams, if detected. Possible options to derive cell level signaling quality may include selecting best beam, N best beams, all detected beams or beams above a threshold. Other options are not precluded. For example, the DL RRM measurement may be made on a on a single beam.

CSI-RS is an example of additional RSs that may be beamformed in RRC-CONNECTED mode in addition to the always-on idle mode RSs.

RSRPs may be measured from the IDLE mode RS. One RSRP value may be measured from the IDLE mode RS per SS block, for example. The measured values are referred to "SS-block-RSRP" and may correspond to beam quality in multi-beam case, at least in idle mode. A UE may, for example, measure one RSRP value from multiple SS blocks in an SS burst set or make multiple measurements. The additional RS for mobility, if defined, may be transmitted on multiple beams.

In NR, UEs indifferent states may perform mobility management measurement with different performance requirements, such as latency, power consumption, etc. In beam-centric NR networks, cells, beams may not be always present to be measured, either due to limited transmissions of measurement signals or frequent beam blockage, e.g., due to susceptibility of narrow beams, UE rotation/mobility, sudden changes of radio environment, etc. In addition, diverse usage scenarios and network deployment scenarios in NR demand appropriate flexibility and configurability of measurement behaviors. Therefore, a new measurement framework is needed, so that flexible measurement configurations, mechanisms and procedures may be provided, such as reporting/triggering on beam level measurements, proper filtering process for measurement signals with different transmission characteristics, multi-level consolidations of measurement results, etc.

For example, as described herein, measurement modeling and filtering may be used in support of cell quality derivation for NR RRC_CONNECTED mode mobility, RRC_INACTIVE mode mobility, or RRC_IDLE mode mobility.

RRC_CONNECTED mode mobility, for example, may include a number of scenarios, such as inter-cell mobility and inter-TRP/intra-cell mobility. Inter-TRP/intra-cell mobility, for instance, may be involved in the case of a split architecture where there is a centralized unit (CU) includes RRC and PDCP entities and a set of distributed units (DUs), such as RLC, MAC, and PHY entities, where the source TRP and the target TRP belongs to different DUs. The RRC_CONNECTED mode mobility may also include Intra-cell/inter beams-group mobility where the beam-group may be a grouping of beams at a level other than TRP level.

Measurement modeling and filtering may be used in support of: groups of beams, e.g., TRP beams; quality derivation for beam management, e.g., TRP Tx beams/UE Rx beams selection; and inter-TRP Tx beams change for NR RRC_CONNECTED mode mobility or RRC_INACTIVE mode mobility.

Measurement modeling and filtering may also be used in support of individual beam quality derivation for intra-TRP beams change (e.g., intra-TRP Tx beam changes, change of UE Rx beam).

Procedures for measurements configuration may include configuration of measurement gaps. A measurement gap may be defined as a period or set of periods in which no UL or DL transmissions are scheduled. During the measurement gap, the UE may perform measurements. Typically, measurement gaps are required for inter-frequency measurements, or inter-RAT measurements, since the UE may need to tune its receiver chains to the target frequency or the target RAT. In the context of beam-centric cell architecture, where coverage is provided through the use of beam sweeping where at any given point in time, a portion of the cell is under the coverage of the available beams while some other portions of the same cell are out of coverage. The current LTE measurement gap mechanism with static measurement gap lengths and static measurement gap period is inadequate for beam-centric cell architectures for a number of reasons.

First, the gap may miss the occasion when a beam is physically present, and therefore need to be timed to coincide with the time occasions when the beams, such as DL TX beams for down link measurement, are physically present, e.g., pointing toward the UE DL RX beam. This may become even more complex considering the fact that NR cells may not be synchronized. The measurement gap needs to coincide with the presence of DL TX beams to measure.

Second, the gap needs to be long enough to allow the UE to detect beams from neighboring cells with potentially unsynchronized beam sweeping patterns.

Figure 7:
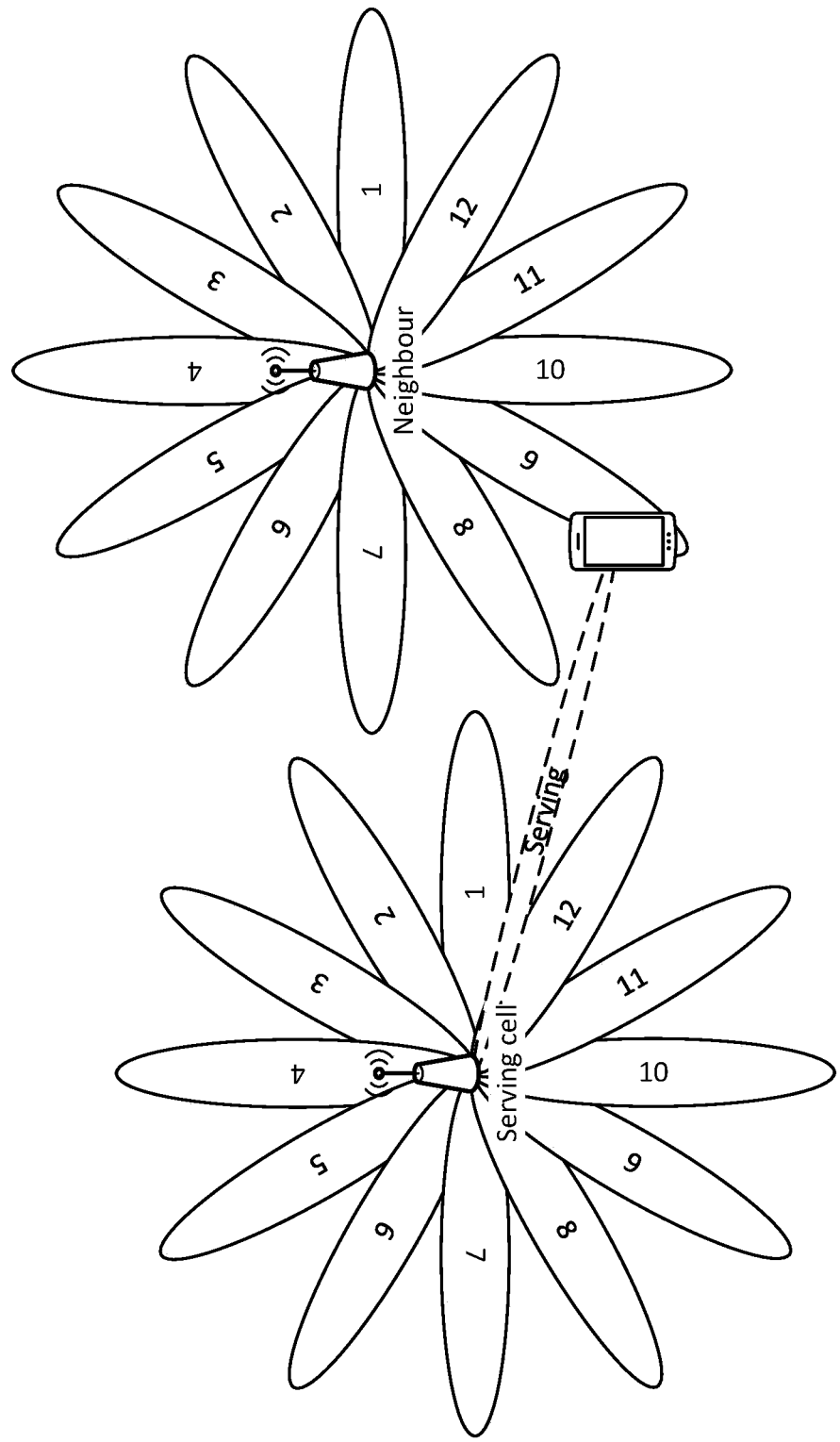
FIG. 7 is a beam diagram that shows an example intra-frequency measurement gap issue.

Furthermore, when wider beams, such as idle mode RS beams, and narrow beams, such as additional connected mode RS beams, are used together for, e.g., in an overlay manner where the UE may receive on both wider beam and narrow beam in overlapping time widow, there is a further challenges even in the intra-frequency case, since the UE may not have the capability to receive on both wider beam and narrow beam at the same time, as illustrated in FIG. 7.

Herein, the term "idle mode RS" and "NR-SS" refer to reference signals such as NR-PSS/SSS. The term "additional RS" refers to signals such as CSI-RS, Demodulation Reference Signal (DMRS), and Mobility Reference Signal (MRS).

{Measurement Modeling and Filtering}

For the purposes of measurement modeling and filtering, reference signals (RSs) may be classified into two broad categories. First are the idle mode RSs, e.g., the RSs the UE may measure in idle mode and inactive mode. Second are the connected mode RSs, e.g., the additional RSs the UE may measure in connected mode.

The UE may primarily use idle mode RSs for cell detection/acquisition and idle mode cell coverage evaluation. In connected mode, in addition to maintaining cell timing and evaluate cell coverage, the UE may also need to transmit and receive data. The UE in RRC_CONNECTED may use idle mode RSs to maintain cell timing and to evaluate cell coverage or report measurements performed on idle mode RSs to the network for cell coverage and mobility decision evaluation.

Measurements of idle mode RSs may also be used to determine RACH configuration that will be used when performing HO for RRC_CONNECTED UEs. However, as extremely high TX/RX data rate are required for narrower beamforming, as compared to for, e.g., idle mode RSs which will be typically transmitted with wider beams, the additional RSs used in connected mode, in addition to idle mode RSs in support of data transmission, may be beamformed differently than idle mode RSs.

Idle mode RSs and additional connected mode RSs may be beamformed differently, e.g., in beam width, bandwidth, periodicity, etc. Therefore various solutions of measurement modeling and filtering design may be applied to solve problems such as which beam/signal type to use for cell quality evaluation, how to derive cell quality from beam level measurements, how to evaluate cell coverage level in support of mobility decisions, and how to perform measurements differently to handle different mobility scenarios. A single apparatus, e.g., a device at a node of a network, may be provided with the capability of performing any or all of the techniques described herein, either separately or in combination, as may be useful in various connection scenarios. The dynamic availability of different types of measurement signals is useful in variety of situations for both RRC_CONNECTED and RRC_IDLE/RRC_INACTIVE operations.

For example, an RRC_CONNECTED UE may be configured to only measure idle mode RSs, which may be beneficial when extended coverage is needed. However, for low data rate such as machine type applications, or where NR is deployed in lower frequencies and with a small number of antenna elements. In those cases, idle mode RSs could be sufficient for RRM measurements for RRC_CONNECTED UEs.

Similarly, an RRC_CONNECTED UE may be configured to only measure additional RSs, and not NR-RS. This may be the case in deployment scenarios in which cell coverage evaluation and mobility decision rely exclusively additional RS measurement. Measurement events and reporting configuration parameters may be set such that, the UE remain in the cell once it transitioned into idle or RRC inactive mode.

An RRC_CONNECTED UE may be configured to measure both the idle mode RSs and the additional RSs. A UE in RRC_IDLE or RRC_INACTIVE mode may be configured, for example, to only measure idle mode RSs.

Figure 8:
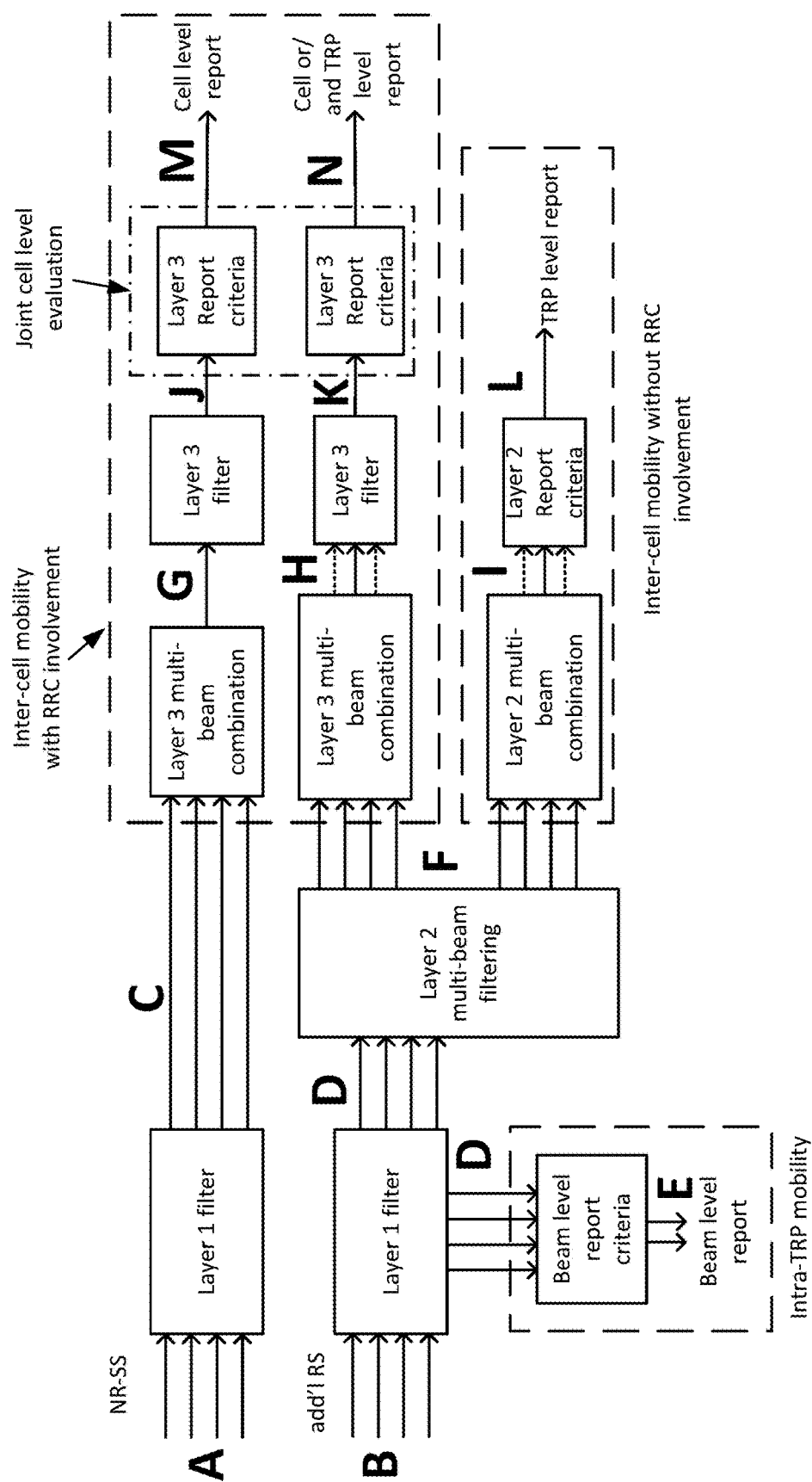
FIG. 8 is a block diagram that shows an example multi-beam multi-level mobility measurement model for NR networks.

FIG. 8 presents a design of multi-beam multi-level mobility measurement model for NR networks. The example of FIG. 8 addresses the tradeoff between relatively short-term fast reaction ( ) to the rapid channel variation in the high frequencies, on the one hand, and the relatively long-term stable, reliable derivation of the cell level quality on the other hand. In the approach of FIG. 8, two types of measurement signals are filtered and processed separately, the NR synchronization signal (NR-SS) is used as an example idle mode RS. CSI-RS is an example of an additional RS that may be used.

FIG. 8 illustrates a multi-beam multi-level mobility measurement model for NR networks. The methods described herein, including the methods of FIG. 8, may be implemented via software, specialized hardware, or a combination thereof, for example.

The approach of FIG. 8 allows different measurement techniques to be applied for different UE states and different levels of mobility. A UE may considers measurement qualities such as RSRP, RSRQ, and SINR, among others, in a variety of scenarios. As referred to herein, Scenario 1 is inter-cell mobility, Scenario 2 is inter-TRP Tx beam changes, and Scenario 3 is intra-TRP beam changes.

In FIG. 8, the inputs at points A and B may be beam or beam pair level measurements. The measurements may be, e.g., samples that are internal to the physical layer. NR-SS may also be transmitted in beams, for example. For Point A, one or more RSRPs may be measured from the NR-SS. For example, one RSRP value may be measured from the NR-SS per SS block. The measured values may be referred to "SS-block-RSRP." SS-block-RSRP may correspond to the "beam quality" in RAN2 agreements in multi-beam case. The time index of the SS block may be used in combination with the SS-block-RSRP to identify the beam associated with the measurement.

For Point B, one or more RSRPs may be measured from the additional RS for CONNECTED mobility if such additional RS are defined, for example.

FIG. 9 shows example measurement samples at points A and B of FIG. 8. The example of FIG. 9 assumes that the UE performs beam sweeping to DL RX beam 2. For additional RS, information of multiple identifiers, such as beam ID and TRP ID, may be carried. For NR-SS, a cell ID may be carried so that measurement results are aggregated SS-Block measurement quantity value from multiple beams.

The Layer 1 filtering of FIG. 8 may involve measurement averaging. Exactly how and when the UE exactly performs measurements will be implementation specific, provided that the output at Points C and D fulfil any the performance requirements, such as those set forth in 3GPP TR 38.913. The averaging operations may be performed in the time domain, which means that measurements among different beams or beam pairs may not be aggregated.

At Points C and D are beam or beam pair level measurement results after time averaging. Time averaging helps to reduce large fluctuations among different measurement samples that are reported by after Layer 1 filtering.

The signals at Point E may be used to check whether beam level measurement report is needed. This is useful for Scenario 3, intra-TRP beam changes. For Layer 1 beam management procedures, e.g., beam quality monitoring and intra-TRP beam switching, the measurement report is time critical and requires quick adaptation to beam quality variation and light weight. This may only apply to additional RSs, since NR-SS is typically cell specific and does not carry beam information such as Beam ID. In general, the information at Points D and E, which is local, time critical, light weight, and adapts quickly to beam quality variation.

Layer 2 filtering is performed on the measurements provided at Point D. The behaviors of the Layer 2 filters may be standardized, and the configuration of the Layer 2 filters may be provided by L2 signaling such as MAC control elements. The filtering reporting period at Point F may be equal to one measurement period at Point D. The measurement is filtered at the individual beam level. For situations where an intra-cell TRP switching or inter-TRP beam switching is needed, Layer 2 mobility management without RRC involvement is enough. e.g., where multiple TRPs share a common MAC entity within the same cell. Fast Layer 2 filtering and reports are defined in FIG. 8 to serve this purpose.

Layer 2 filtering operations may include a moving weighted average for an individual beam, for example, according to the formula:

$$F_n = (1-a) \cdot F_{n-1} + a \cdot M_n$$

where the $M_n$ is the latest received measurement result of one beam or one SS-Block-RSRP from Layer 1 filtering. The $F_n$ is the updated filtered measurement result. $F_{n-1}$ is the old filtered measurement result. $F_0$ is set to $M_1$ when the first measurement result from Layer 1 filtering, $a=\frac{1}{2}^{(k/4)}$, where k is the filter coefficient for the corresponding measurement quantity received in measurement configurations. The filter input rate is implementation dependent, and may be determined by output rate of layer 1 filter.

The signals at Point F of FIG. 8 are beam or beam pair level measurement results after Layer 2 filtering. After Point F, a Layer 2 multi-beam combination may be used to derive the quality of a group of beams, such as TRP beams. This is useful for, e.g., Scenario 2, inter-TRP Tx beam changes. The quality derivation may be used for beam management, e.g., for TRP Tx beams/UE Rx beam selection or inter-TRP Tx beams change for NR RRC_CONNECTED mode mobility or RRC_INACTIVE mode mobility.

Multiple options are available for which beams to select for inclusion in a group to be assessed. A group of beams may include, for example, only the best beam, a certain number of the best beams, all detected beams, or all beams exceeding a configurable threshold measurement quantity such as RSRP, RSRQ, or the like.

For scalability and flexibility, the manner in which beams are selected for inclusion in a set of being evaluated may be controlled and configured by network. For example, a number of beams, N, above a threshold, may be used, where both N and the threshold are set by the network. Appropriate configurations of the value of N and the threshold may be used to cover many options. For example, set N to be 1, and set threshold value to be a small enough value, N best beams above a threshold is actually selecting the best beam.

The signals at Point I are the output of Layer 2 multi-beam combination, and may be a single value to represent the quality of a group of beam. For example, where the group of beams are from the same TRP, the single value represents the TRP's quality. Similarly, a single value may represent the quality of a selected group of beams. The processing between Points I and L generally deals with inter-cell mobility without RRC involvement, where faster L2 filtering and reporting may suffice.

Layer 3 multi-beam combination may be used after Point F for cell level mobility measurement. This is useful for Scenario 1, inter-cell mobility, for example. The options to be considered regarding which measured beams a UE could select in order to derive a cell level quality may be the same as Layer 2 multi-beam combination after F. The difference in this module is that the parameters and threshold values such as the value of N and a threshold value may be configured separately from a Layer 2 multi-beam combination. Specifically, for inter-cell mobility, more stable and reliable cell quality derivations are expected, since the costs of signaling overhead and latency incurred are typically much higher than for intra-cell mobility, e.g., UE context/data forwarding and path switching, etc. As a result, beam combination/consolidation option may be preferred for a longer-term measurement, such as, averaging the value in a large time window.

For Layer 3 multi-beam combination, if N beams above a threshold are considered to derive cell level quality, where N is greater than 1, there may be other different options. For example, one option is to choose any N beams with measurement quantity above the threshold from all measured beams, where N beams<all detected beams. However, this may not be a good option if the selected beams are correlated, e.g., in spatial correlation, and experiencing the same channel path that would likely be together above a threshold. A similar concept called as "beam grouping" has been discussed in RAN1. See, e.g., 3GPP R1-1703184 On QCL Framework and Configurations in NR Nokia, Alcatel-Lucent Shanghai Bell, February 2017. The beams within a beam group may be highly correlated and experience similar channel propagation, while beams from different beam groups are with low correlation, e.g., with low correlation in terms of spatial correlation, channel response correlation, etc. The network may provide assistance information, e.g., which beams are Quasi Co Located, to UE to avoid selecting correlated beams for cell quality derivation, so that more robust cells, e.g., cells having more alternative beams with diverse beam properties, may have higher derived qualities.

The signals at Point H are the output of Layer 3 multi-beam combination after F, and include at least one value to represent cell level quality. In addition, beam level measurement results, such as beam ID and beam quality from selected beams, may be also included.

Layer 3 multi-beam combination may be used after Point C. Since cell specific NR-SS may not carry any beam level information, such as beam ID or beam group ID, the combination approach may simply be aggregating the value of measured multiple SS-blocks from the same cell over the time domain. In one example, the linear power values of up to N SS-block-RSRP measurements above a threshold may be averaged, for example, where the threshold may be an absolute threshold or a relative threshold, e.g., relative to the strongest SS-block-RSRP.

The signals at Point G are the output of Layer 3 multi-beam combination after C, and may contain only cell level quality based on aggregated value of SS-block-RSRP, if NR-SS does not carry beam level information.

Layer 3 filtering may be used after Point G. The input may be only a cell level quality. The filtering formula may be similar to that used for Layer 2 filtering, but with L3 specific parameters, e.g., k and averaging time period. To obtain a more stable and reliable filtering result, the averaging time window within the Layer 3 filtering is typically larger than that of Layer 2 and Layer 1. The network may configure the UE with specific Layer 3 filtering. The behaviors of the Layer 3 filters may be standardized, and the configuration of the Layer 3 filters may be provided by RRC signaling. Filtering reporting period at J equals one measurement period at G.

Layer 3 filtering may be used after Point H. The input is dependent on the output of Layer 3 multi-beam combination after F, which may include not only cell level quality but also beam level information. A filtering formula like that used for Layer 3 filtering after G may be applied to smooth out the value of cell level quality. Again, L3 specific parameters for this module may be configured differently, e.g., via the network. Optionally, here after Point H for beam level quality information, filtering operations may not be performed, e.g., where information for different beams is used as input from H. Instead, for example, the beam information may be directly forwarded to Layer 3 report evaluation.

The signals at points J and K both include cell level measurements after processing in the Layer 3 filter. The cell level measurements result from operations based on filtering formula with specific parameters. For Point K, beam level information may be included if the Layer 3 filtering after H has beam information as an input.

The Layer 2 and Layer 3 report criteria modules of FIG. 8 may be used to check whether measurement reporting is actually necessary at Point M, N, and L, according to the defined triggering. The UE may evaluate the reporting criteria at least every time a new measurement result is reported at Point J, K, and I. The reporting criteria may be standardized and the configuration may be provided by network signaling, (e.g., as Layer 2 or Layer 3 signaling).

If both RS measurement results for the same cell are available, they may be used for joint cell level evaluation, The signals at Points M, N, and L include measurement report information sent on the radio interface, e.g., via a message. For Point M, cell level qualities may be reported. For N, at least cell level qualities may be reported, and beam level quality/information may also be included depending on earlier processing. For Point L, a quality of a group of beam, e.g., the beams of a TRP if the group of beams belongs to the same TRP, and/or information for an individual beam may be reported.

Joint evaluation of the signals at Points M and N may be used when both measurement signals are available for CONNECTED mode UEs. The network may perform independent RRM measurement configuration for both signals, like the separate process pipelines shown in FIG. 8. At the step of Layer 3 report criteria evaluation, joint evaluation of cell level quality for both signals may be needed. One example of joint evaluation is that UE firstly uses NR-SS measurements to discover neighboring cells. Then the network may use this information to configure additional RS measurements, corresponding to likely handover candidate cells, to get more accurate and detailed measurements. For example, the network may turn on an additional RS transmission on a subset of beams, TRPs or/and cells, and then configure the UE to measure the same. Previous measurement results based on NR-SS may be aggregated as SS-Block quantities, such as SS-block-RSRP and/or SS-block-RSRQ, from multiple beams, and may not accurately reflect cell quality after handover.

In the FIG. 8, both NR-SS and additional RS signals have been considered. For a number reasons, the two types of measurement signals may be filtered independently.

First, the two types of measurement signals may have different characteristics such as beam width, periodicity, signal design, and required measurement duration for full beam sweep. For example, assume NR-SS is wide-beam based and the additional RS is narrow-beam based. Due to the different beamforming gain, measurement quantity/quality of NR-SS may be generally lower than that of additional RSs. When generate a single value to represent cell level quality by merging measurement results from both signals, it is hard to fairly perform merging operations. For example, when beam level measurement samples from measured NR-SS are more than the measurement samples from measured additional RS, the single value may be lower than the case that more results are from measured additional RS. In addition, the measurement quantity/quality of the two signals may be even more different due to the time varying characteristics of wireless channel and being measured at different time instances. So it may be better to do beam results consolidation independently.

Second, when properties of the two measurement signals, e.g., transmission resources, traffic loading of used transmission beams, etc., are changed independently, parameters in corresponding modules such as, reporting criteria, and combination methods, etc., may be separately configured.

Third, sometimes only one signal is available or considered. For example, in the case of IDLE/INACTIVE mode UEs, only NR-SS may be available. Only additional RS is used for CONNECTED mode UEs. When only one signal is available or considered, the whole model/filtering design still may be used as a common framework. For example, the measurement sampling of the Layer 1 filtering of one measurement signal processing path may be turned off.

Figure 17:
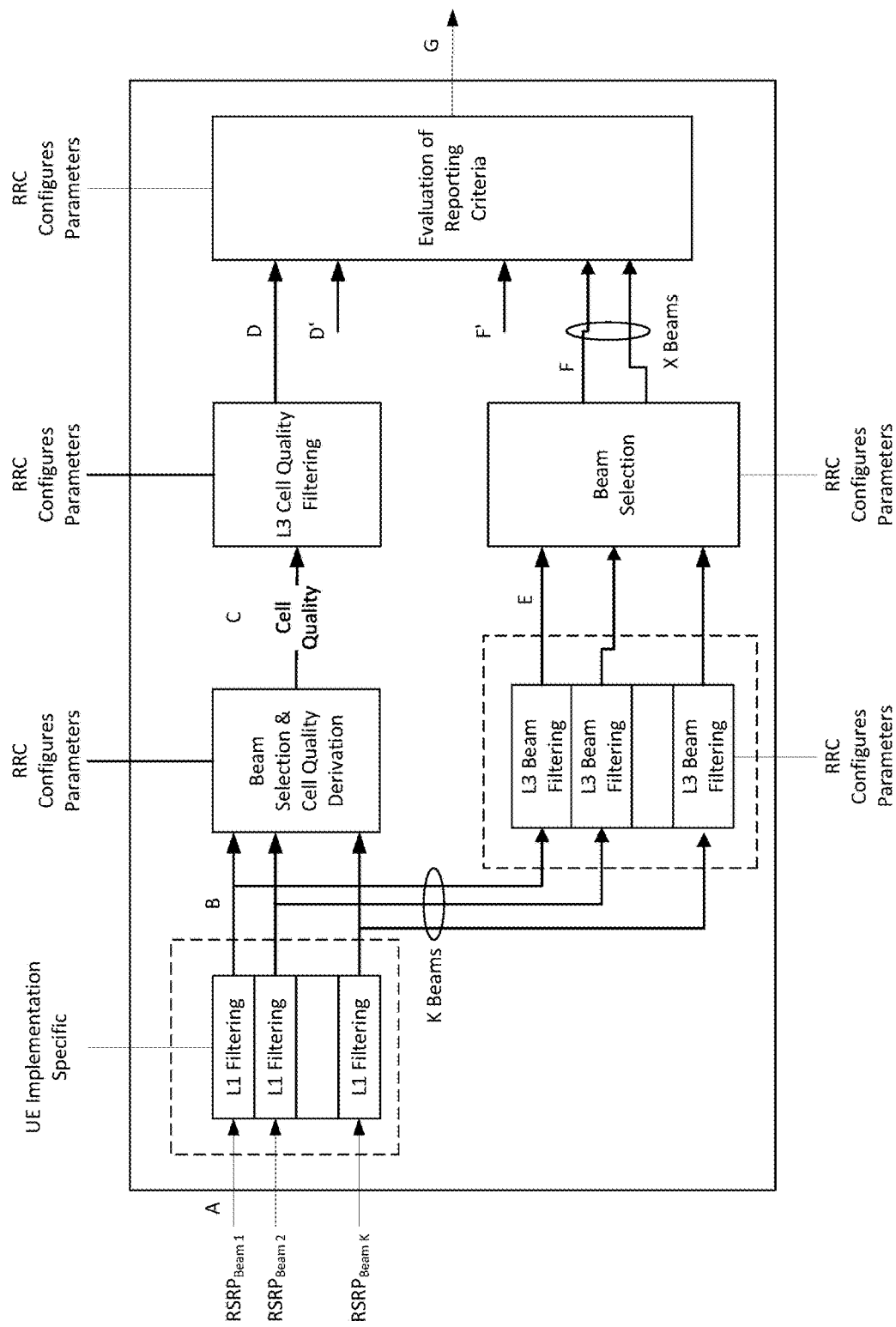
FIG. 17 is a block diagram of an example alternate NR measurement model.

An alternate NR measurement model is shown in FIG. 17. In this example, the same measurement model is used for idle mode RS and additional RS based measurements. The top path through the model (Points A-D) is used to compute cell level measurements and the bottom path (Points A-F) is used to compute beam level measurements. Without loss of generality, in the example of FIG. 17, NR-SS is used as example idle mode RS, and CSI-RS as example additional RS, and RSRP as an example measurement quantity.

In FIG. 17, the inputs at Point A are measurements, e.g., samples that are internal to the physical layer. L1 Filtering is internal filtering of the inputs measured at Point A. The exact filtering is implementation dependent. The information at Point B are measurements reported by L1 to L3 after L1 filtering.

Beam selection and cell quality derivation involves cell quality measurements. In the example of FIG. 17, the cell quality measurements are based on the N best beams, where K is equal to the number of measured beams and ($N \leq K$). The value of N may be configured per carrier or per cell. The same value of N may be used when performing NR-SS and CSI-RS based measurements. Alternatively, different values of N may be configured for NR-SS and CSI-RS based measurements. When N>1, up to N of the detected beams above a threshold may be averaged to derive the cell quality. The threshold may be an absolute threshold or a relative threshold. For example, the threshold may be relative to a measurement of the serving beam, the strongest beam, or the beam of quality beam, etc.

The information at Point C is a cell quality measurement. L3 Cell Quality Filtering is performed on the measurements provided at Point C. The behavior of the L3 filters may be standardized, and the configuration of the L3 filters may be provided by RRC signaling. The filtering reporting period at D may equal one measurement period at B.

The signals at Point D are cell quality measurements after processing in the L3 cell quality filter. The reporting rate may be identical to the reporting rate at Point B. This measurement is used as input for one or more evaluations of reporting criteria.

L3 Beam Filtering is performed on the measurements provided at Point B. The behavior of the L3 filters may be standardized, and the configuration of the L3 filters may be provided by RRC signaling. The filtering reporting period at E may equal one measurement period at B.

The information at Point E is beam measurements after processing in the L3 filter. The reporting rate may be identical to the reporting rate at Point B. This measurement may be used as input for one or more evaluations of reporting criteria.

Beam Selection involves the selection of the measurement results for the best beams. Up to X best beams, for X≤K, may be selected based on a threshold. The threshold may be an absolute threshold or a relative threshold, e.g., relative to the measurement that corresponds to the serving beam, the strongest beam, the highest quality beam, etc. Alternatively, the X best beams may correspond to the X strongest beams. The output of the Beam Selection function may include the beam IDs and/or the measurement quantities. e.g., RSRP, RSRQ, and SINR. The time index of the SS block may be used as the beam ID for NR-SS based measurements and the CSI-RS ID may be used as the beam ID for CSI-RS based measurements.

The information at Point F includes beam measurements of the best beams. Beam measurements for up to X best beams are selected. The actual number of beam measurements selected may be less than X, depending on the number of detected beams and/or the configured threshold.

Evaluation of Reporting Criteria involves checking whether actual measurement reporting is necessary at Point G. The evaluation may be based on more than one flow of measurements at reference Points D and F, e.g., to compare between different measurements. This is illustrated by inputs at Points D, D', D and F'. The UE may evaluate the reporting criteria at least every time a new measurement result is reported at Points D, D', D and F'. The reporting criteria may be standardized, and the configuration may be provided by RRC signaling for UE measurements.

The information at Point G is a measurement report information, e.g., a message, sent on the radio interface. The measurement report may include cell level measurements and/or beam level measurements.

{Measurement Configuration and Procedures}
{Measurement Gap}

In NR, measurements gaps may be used to perform inter/intra-frequency neighbor cell measurements as well as serving cell measurements. NR-SS signals are transmitted according to the SS burst set configuration, therefore, a simple periodic measurement gap may not be sufficient for performing measurements of these signals.

The following scenarios are example measurement use cases where gap configuration maybe required, either implicitly or explicitly. Each of these scenario may involve different gap configurations:

TABLE 3

| Scenario A1 | Intra-Frequency | UE RX beam is in the direction of the beams to be measured (see FIG. 7) |
| Scenario A2 | Intra-Frequency | UE RX beam is in different direction than the beams to be measured |
| Scenario B1 | Inter-Frequency | UE RX beam is in the direction of the beams to be measured |
| Scenario B2 | Inter-Frequency | UE RX beam is in different direction than the beams to be measured |
| Scenario C1 | Inter-RAT, | non-dual connectivity (single link) |
| Scenario C2 | Inter-RAT | dual connectivity (or multi-conneciivity). |

A UE capability bit may be associated with, e.g., the scenarios described in Table 3. The UE may signaled it capability to the gNB to help gNB in the provision of the proper measurement configuration gap.

For NR, a measurement gap configuration may be used that is dependent on the SS burst set configuration of the serving cell and/or neighbor cells.

Figure 10:
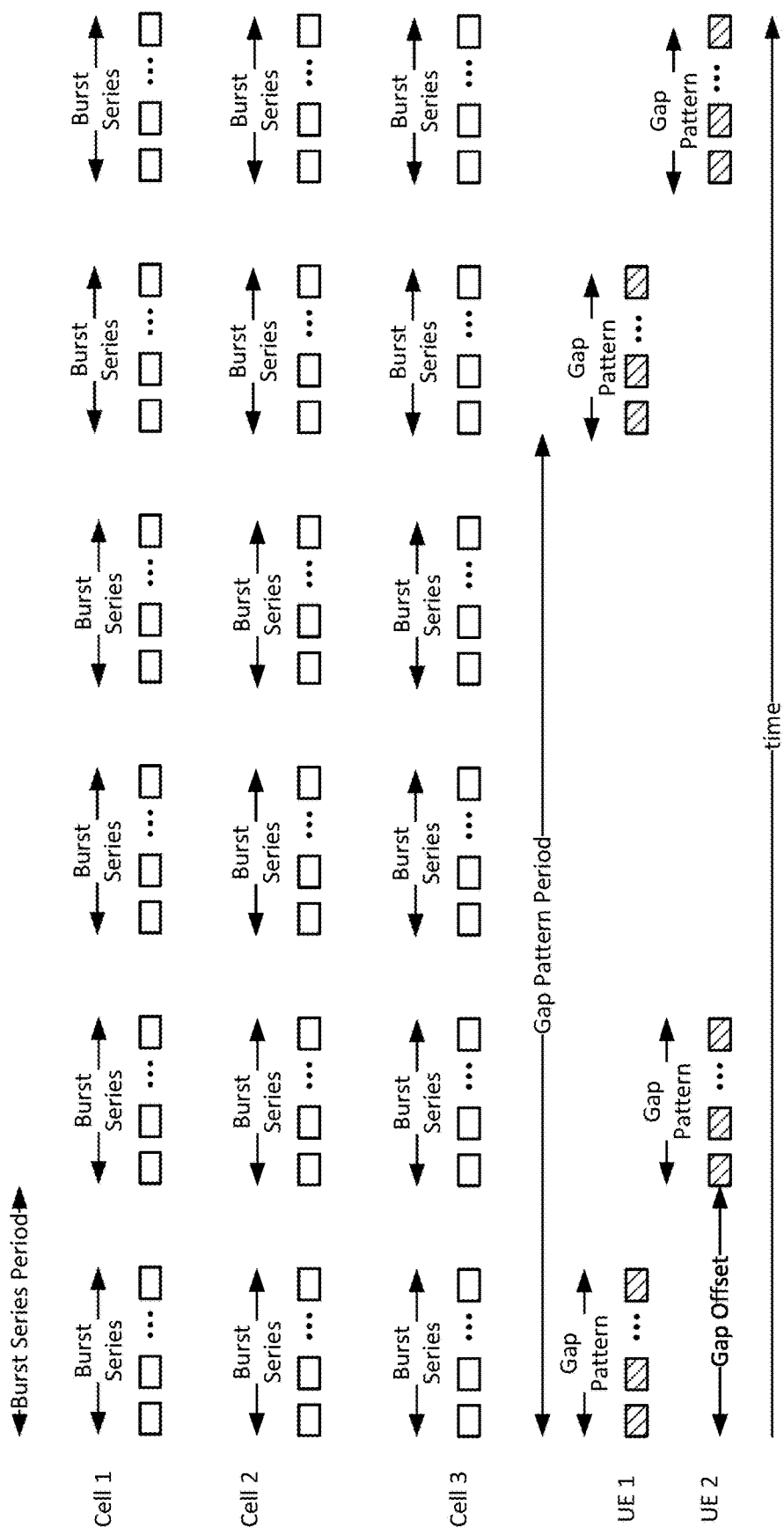
FIG. 10 is a timing diagram that shows an example a gap pattern for synchronous SS burst series configuration.
Figure 18:
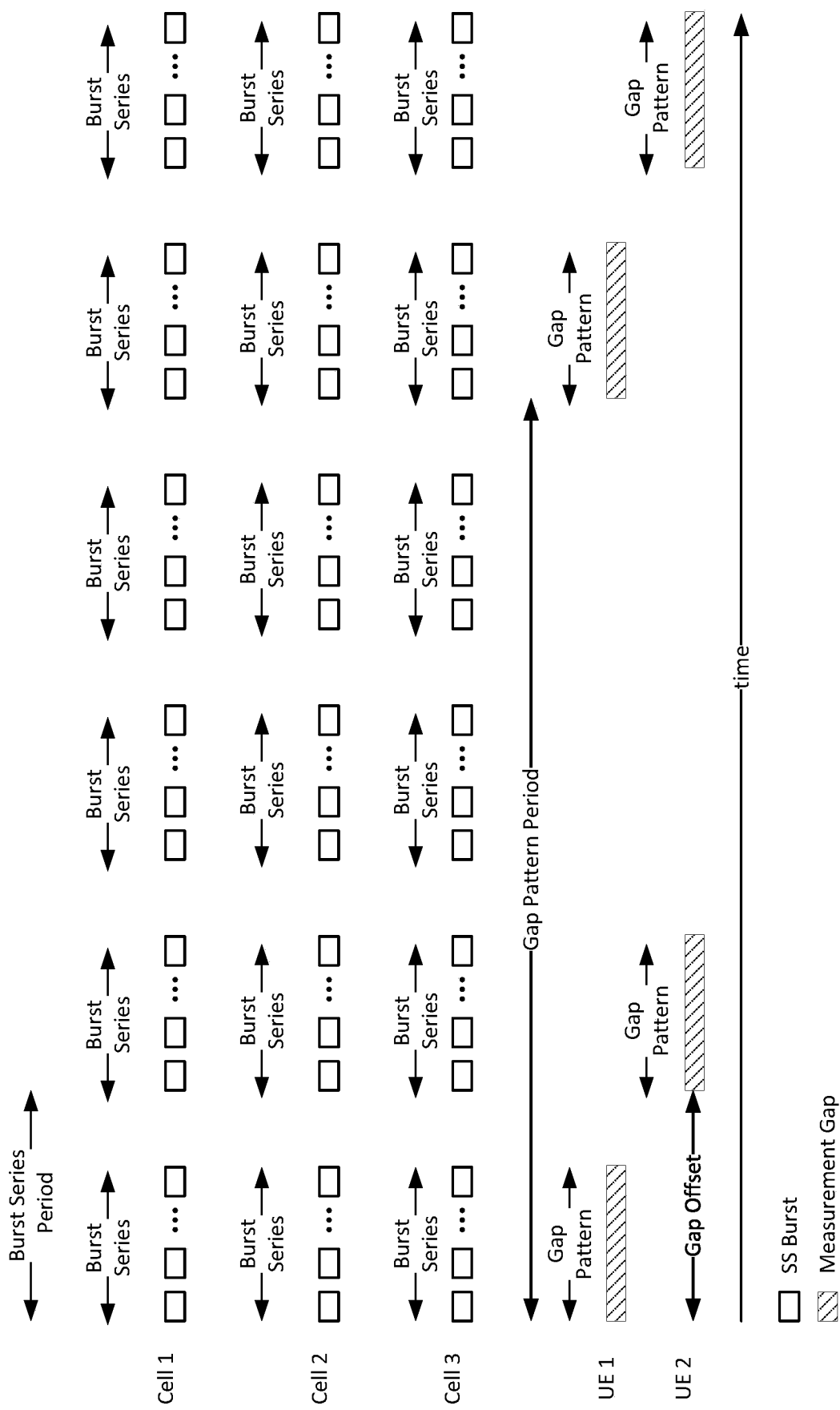
FIG. 18 is a timing diagram of an example alternate gap pattern for a synchronous SS burst series configuration.

For NR deployments, neighboring cells may be configured with the same SS burst series configurations. e.g., a synchronous burst series configuration. When cells are deployed in this way, a gap pattern aligned with the SS burst series configuration of the serving cell may be used to measure the serving cell as well as the neighbor cells. FIG. 10 shows an example gap pattern configuration that may be used for a synchronous burst series configuration. The gap pattern is composed of a series measurement gaps aligned with the SS bursts of the SS burst series. The gap pattern is periodic, where the period may be an integer multiple of the period of the SS burst series. To avoid having all UEs in a measurement gap at the same time, a gapOffset parameter may be used to distribute the UEs to different occurrences of the SS burst series. Alternatively, the gap pattern may be composed of a single measurement gap that spans the entire burst series, as shown in FIG. 18.

In another embodiment, the SS burst series configurations of the neighbor cells are defined with an offset relative to the serving cell of then UE. In this embodiment, the UE is configured with time domain offset between beam sweeping patterns (e.g., xSS block, xSS burst and xSS burst series, RS block, RS burst, RS burst series) of its serving TRP/cell versus neighbor TRP/cells. The offsets may be configured through common broadcast signaling, dedicated signaling. The gNB may configure the UE with the offset values at the initial connection establishment or during subsequent reconfiguration. The Offset value may be neighbor cell specific, neighbor TRP specific or specific to a group of beams. The offset may be expressed in terms of one or more of the following: number of symbols, in number of slots or mini-slots, number of subframe, number of radio frame. The offset may be zero in which case, the beam sweeping pattern between the UE serving cell and its neighbor coincide in time domain as illustrated in FIG. 10. The offset may be frequency specific or component carrier specific gap offset or cell specific gap offset. The UE use the offset information to implicitly derive the beam sweeping pattern (e.g., the burst series configuration) of the cells or TRPs or group of beams that are neighbor with its serving beam or serving TRP or serving cell. The UE may use as implicit measurement gap, the time period within the beam sweeping cycle where there is no serving beam transmitting in the direction of the UE RX beam. The UE may also be configured explicitly by the gNB with measurement gaps. Such measurement gap may be required for the UE to measure beams transmission in the same direction as the serving beam of the UE for, e.g., in the case of inter-frequency measurement or measurement of wider beam while the UE is in reception mode with a narrower high power beam.

Figure 11:
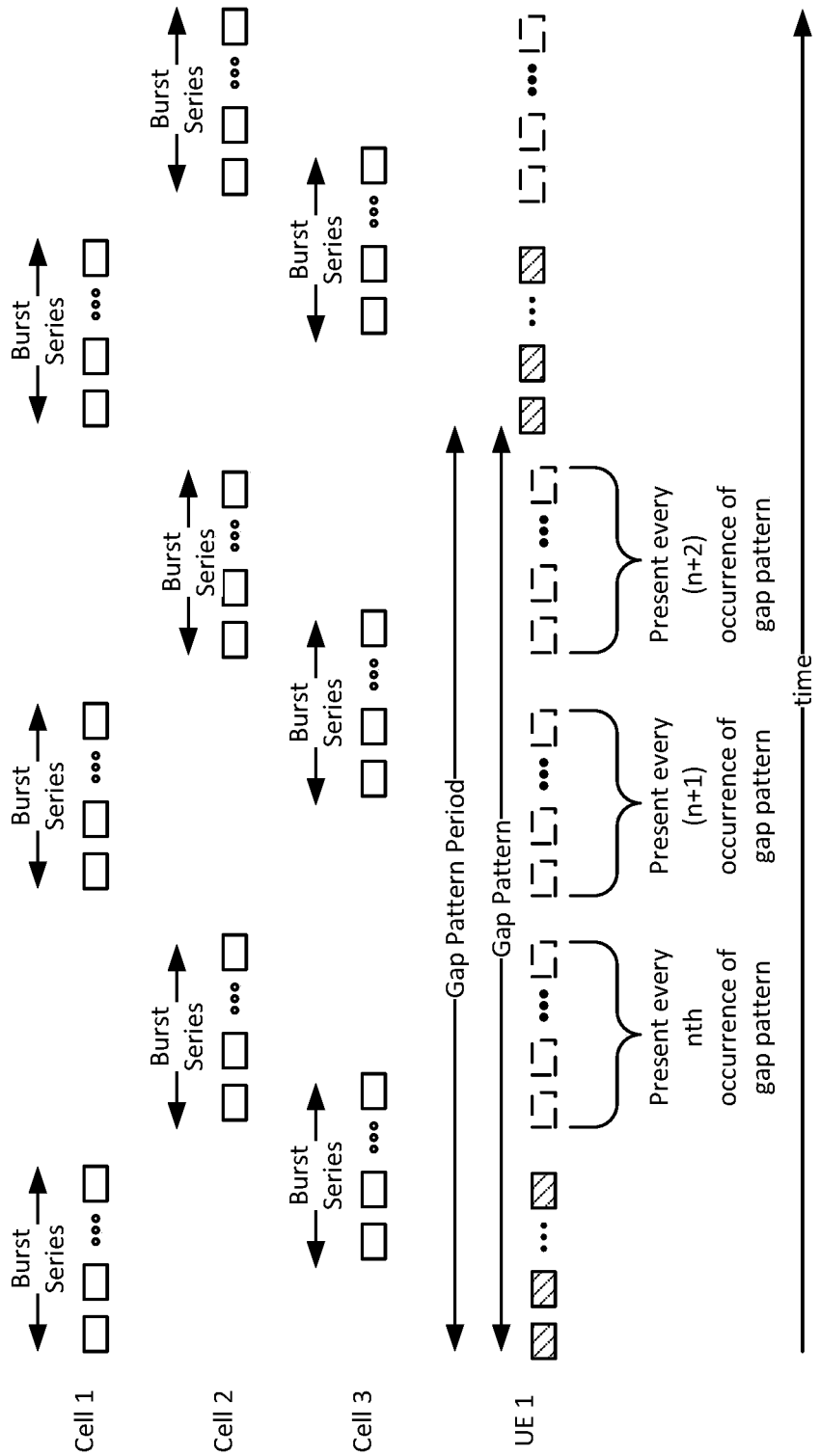
FIG. 11 is a timing diagram that shows an example asynchronous SS burst series configuration.
Figure 19:
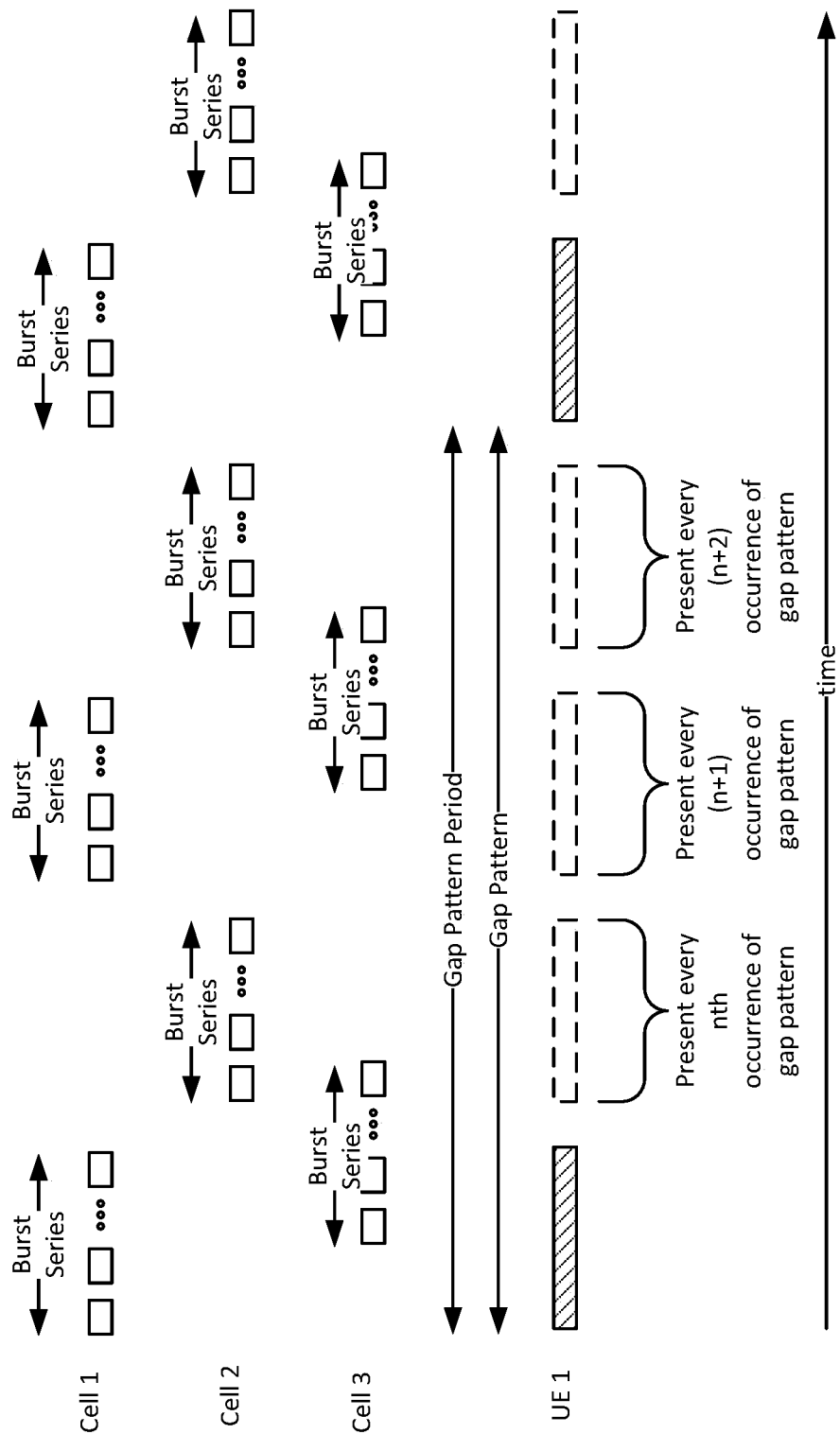
FIG. 19 is a timing diagram of an alternate gap pattern for an asynchronous SS burst series configuration.

Alternatively, neighboring cells may be configured with different SS burst series configurations. We refer to this as an asynchronous burst series configuration. When cells are deployed in this way, a gap pattern aligned with the SS burst series configuration of the serving cell cannot be used to perform measurements of the neighbor cells, since the measurement gaps are not guaranteed to be aligned with the SS bursts of the neighbor cells. One solution to perform measurements for such a deployment would be to use a gap pattern that includes a set of gaps aligned with the burst series of the serving cell to perform serving cell measurements and an additional set of gaps offset by a variable amount that is incremented with each occurrence of the measurement gap to measure the neighbor cells as shown in FIG. 11. Alternatively, the gap pattern may be composed of a single measurement gap that spans the entire burst series as shown in FIG. 19.

Figure 12:
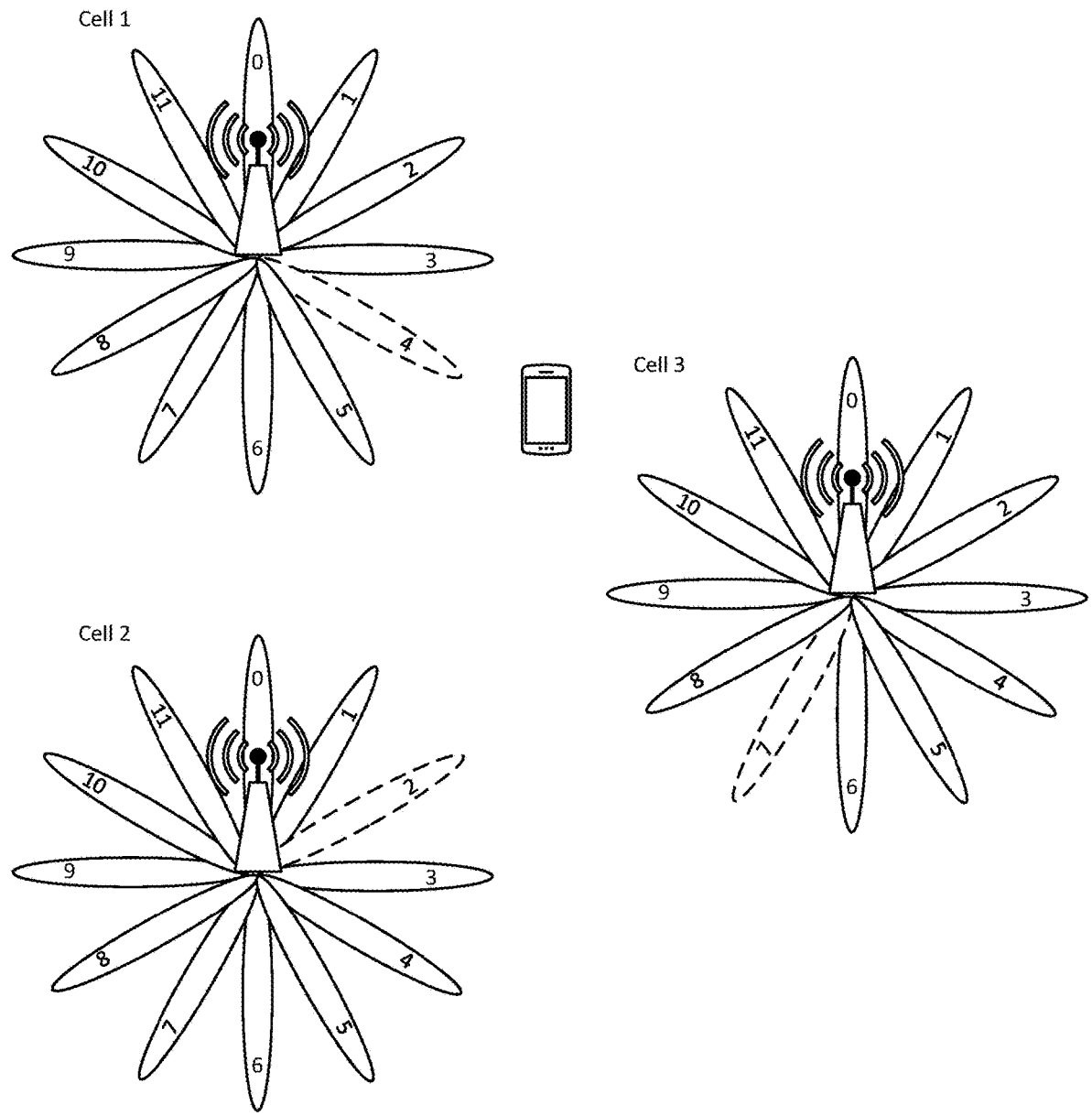
FIG. 12 is a beam diagram that shows an example asynchronous deployment with known angular offset between cells.

For deployments where the cells may not be synchronized in time domain, it may be possible to determine the angular offset between the sweeping patterns of the cells with respect to the serving cell. This offset may be used by the UE to determine when a neighbor cell will be transmitting SS blocks in its direction and therefore when the UE should perform a measurement of that cell. FIG. 12 shows an example where cell 2 and cell 3 are offset from cell 1 by −60 and 90 degrees respectively. The angular offset could be used in combination with information about the topology of the network to optimize when the UE performs the measurements of cell 2 and cell 3.

A set of example NR gap pattern configurations is shown in Table 4. An example NR MeasGapConfig IE is also shown in Example A (see appendix). The example NR MeasGapConfig IE includes an optional alignWithBurstSeries parameter that is used to indicate if the gap pattern is composed of a set of gaps aligned with the bursts of the burst series as shown in FIG. 10 and FIG. 11 or if it is composed of a single gap that spans the burst series as shown in FIG. 18 and FIG. 19. The example NR MeasGapConfig IE also includes an optional incrementalGap parameter that is use to indicate if an additional gap with an offset that increments as shown in FIG. 11 and FIG. 19 is also configured.

TABLE 4

NR Gap Pattern Configurations

| Gap Pattern Id | Measurement Gap Length (MGL, ms) | Measurement Gap Repetition Period (MGRP, ms) |
| --- | --- | --- |
| 0 | 2 | 40 |
| 1 | 2 | 80 |
| 2 | 2 | 160 |
| 3 | 6 | 40 |

TABLE 4-continued

NR Gap Pattern Configurations

| Gap Pattern Id | Measurement Gap Length (MGL, ms) | Measurement Gap Repetition Period (MGRP, ms) |
| --- | --- | --- |
| 4 | 6 | 80 |
| 5 | 6 | 160 |
| 6 | 11 | 40 |
| 7 | 11 | 80 |
| 8 | 11 | 160 |

{Event Triggering}

A NR UE may be required to measure multiple beams (if available) within a cell. This will increase the UE power consumption and latency. It is necessary to define some trigger events similar as in LTE to reduce UE measurement effort and power consumption.

In beamformed systems, mobility scenarios may be different (as listed in problem statement). These diverse mobility scenarios require flexible measurement configurations. Different measurement trigger events and associated parameters/thresholds could be configured by taking into account the intra/inter-cell operations that lead to different level of signaling overhead and latency. Typically, inter-cell or inter-gNB mobility cases require relatively long-term evaluation with higher threshold values since higher layer costly signals and context/data transfer are typically needed while intra-cell or intra-TRP mobility cases require relatively short-term evaluation with lower threshold values since no higher layer signaling or/and context/data transfer are needed. And the short-term evaluation based trigger events enable a UE react/adapt fast to frequent variations in channel quality due to use of high gain narrow beams. Moreover, it could be considered that during the measurement events configuration, network could indicate whether the UEs compare the cell-specific measurement result or beam-specific measurement result from serving cell and/or neighboring cell, and further indicate the level of measurements the UEs report (e.g., which level of beam-level measurement results is included, beam ID only or also beam quality) when conditions of trigger events are satisfied.

It has already been agreed that NR will support at least events like LTE A1-A6. RSRP, RSRQ, and RS-SINR may be used as trigger quantities in event triggering. The trigger quantities are measured on NR-SS or/and additional RS. In measuring any one of the two types of signals, TRP/cell level quantity is derived based on measurement results. Examples NR-A1 through NR-A8 include trigger events in NR networks affecting inter-cell mobility scenarios.

In example NR-A1, the average value or weighted sum of trigger quantity (e.g., RSRP, RSRQ and RS-SINR) of N best beams of serving cell becomes offset better than a configurable threshold and the number of acceptable beams (e.g., measurement quantity such as RSRP higher than a configurable value) is not less than a configurable value.

In example NR-A2, the average value or weighted sum of trigger quantity of N best beams of serving cell becomes worse than a configurable threshold and the number of acceptable beams in serving cell is less than a configurable value.

In example NR-A3 the average value or weighted sum of trigger quantity of N best beams of a neighbor cell becomes offset better than PCell/PSCell and the number of acceptable beams in the neighbor cell is no less than a configurable value or more than that in PCell/PSCell.

In example NR-A4, the average value, or weighted sum, of trigger quantity of N best beams of a neighbor cell becomes better than a configurable threshold and the number of acceptable beams in the neighbor cell is not less than a configurable value.

In example NR-A5, the average value or weighted sum of trigger quantity of N best beams of serving cell becomes worse than one configurable threshold and of a neighbor cell becomes better than another configurable threshold. In addition, the number of acceptable beams in serving cell is less than one configurable value and the number of acceptable beams in the neighbor cell is not less than another configurable value or more than that in serving cell.

In example NR-A6, the average value or weighted sum of trigger quantity of N best beams of a neighbor cell becomes offset better that of SCell, and the number of acceptable beams in the neighbor cell is not less than a configurable value.

In example NR-A7, the number of acceptable beams of the PCell/PSCell becomes greater than a configurable value.

In example NR-A8, the number of acceptable beams of the PCell/PSCell becomes less than a configurable value.

In the case of inter-gNB or intra-gNB level inter-cell mobility scenarios, such trigger events may be used by applying different groups of threshold/values and/or performing average or sum operations within a different size of time period. For example, for inter-gNB inter-cell mobility scenario, trigger quantity is averaged/summed in a relatively large time period, and the threshold values may be larger than that of intra-gNB inter-cell mobility scenario, in order to accumulate long-term and relatively more stable measurement results to avoid costly handover actions among different gNBs.

For intra-cell TRP switching mobility scenarios, we may define another set of trigger events NR-T1 to T6 by replacing the cell level value in NR-A1 to A6 with the TRP level value.

For intra-TRP beam switching mobility scenarios, we may define some example beam level trigger events. In Scenario NR-BM1, any one serving beam (if one or more than one serving beams) quality quantity (e.g., RSRP, RSRQ, and RS-SINR) becomes better than a configurable threshold. In Scenario NR-BM2, any one serving beam (if more than one serving beam) quality becomes better than the quality of the best beams in all detectable neighbor cells or TRPs. In Scenario NR-BM3, any one serving beam quality becomes worse than a configurable threshold. In Scenario NR-BM4, any one serving beam quality becomes worse than an average value of a neighbor cell or TRP.

In NR, according to the captured recent RAN1 agreements, an RRC_CONNECTED UE will at least be able to measure an IDLE RS, defined as the synchronization sequence (NR-SS), and possibly an additional DMRS for PBCH. Without loss of generality we take NR-SS as an example. In high frequencies, NR-SS is very likely to be transmitted in multiple beams. NR-SS encodes a cell ID so that UE may measure and differentiate the NR-SS from serving cell or neighbor cells, as also agreed in RAN1. However, since it is a common understanding that NR-SS is cell-specific, but not TRP-specific (unless the network deployment has a one-to-one mapping between a cell and a TRP and each cell consists of a single TRP) or UE-specific, the network should be able and only able to configure a UE events such as those in Examples NR-A1 to A6 for NR-SS so that UE may trigger cell-based measurement reports in RRC_CONNECTED.

Figure 13:
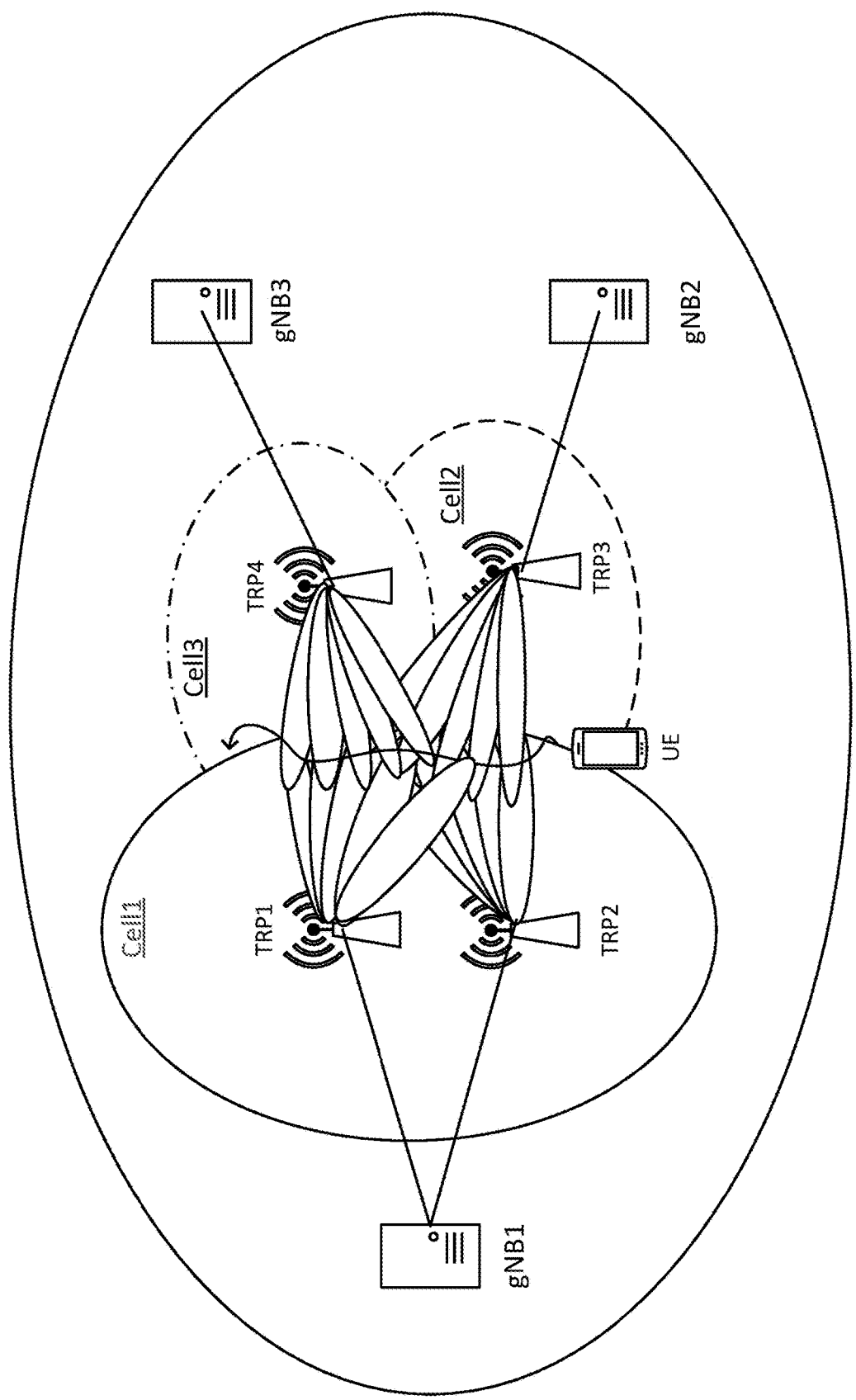
FIG. 13 is a beam diagram that shows an example case where a UE may experience frequent ping-pong inter-gNB and inter-cell TRP/beam switching if additional RS only contains beam identity.

For additional RS, the common understanding so far is that additional RS will at least carry some kind of beam identifier (either implicit or explicit). Whether additional RS contains other identifiers like cell ID or/and TRP ID, it is still an open question. FIG. 13 is an example to explain when it is beneficial to have TRP ID and cell ID encoded. In FIG. 13, when the RRC_CONNECTED UE travels along the bottom-up red trajectory, UE measures the network configured additional RS which are transmitted in the narrow beams. There may be two issues.

First, if based on only beam-level event triggers (such as in Scenarios NR-BM1 to BM4), quality of narrow beams may degrade quickly and frequent measurement/mobility events may be observed.

Second, if addition RS does not carry information for UE to map each beam with corresponding TRP and cell, UE may perform ping-pong mobility handover among these different cells, TRPs and gNBs, where unnecessary expensive context/data forwarding happen (also against one of the recent RAN2 meeting agreements that context/data forwarding should be minimized).

To solve issues in the context of FIG. 13, there are at least three possible solutions. In Solution 1, the network dynamically and carefully configure additional RS to be transmitted on specific beams. For example, in FIG. 13, network may turn on additional RS transmission (either based on UE location/mobility estimations/predictions or requested by UE) to transmit only within cell1/gNB1 governed area. However, this solution requires accurate information of UE and frequent/costly coordination to make the scheduling. When the number of UE increases, the scheduling becomes more complicated.

In Solution 2, the UE relies on a group of additional RS instead of only one beam and may use defined beam level trigger events. This solution only solves the first issue. For the second issue, UE still has no information whether the group of additional RS is from the same TRP/cell or different TRP/cell.

In Solution 3, each additional RS carries not only beam identify but also TRP or/and cell ID, or/and even gNB ID. During measurement of additional RS, beam level measurement results will be translated into cell-level or/and TRP-level measurement, so that UE may choose to prefer intra-TRP, intra-cell beam/TRP switching. Also, different groups of offset and threshold values used in defined triggering events may be carefully designed to avoid unnecessary ping-pong mobility behaviors. This solution requires higher overhead since additional RS carries more information during transmissions. Also TRP/cell ID has to be designed to be unique in a certain area, leading to gradually increased decoding complexity to UE.

The network decides which solution may be used according to actual deployments, and configure necessary information to UE (e.g., which resource is used by additional RS to transmit, etc.). In the case of Solution 3 is applied, FIG. 14 shows how triggering events could be used.

Figure 14:
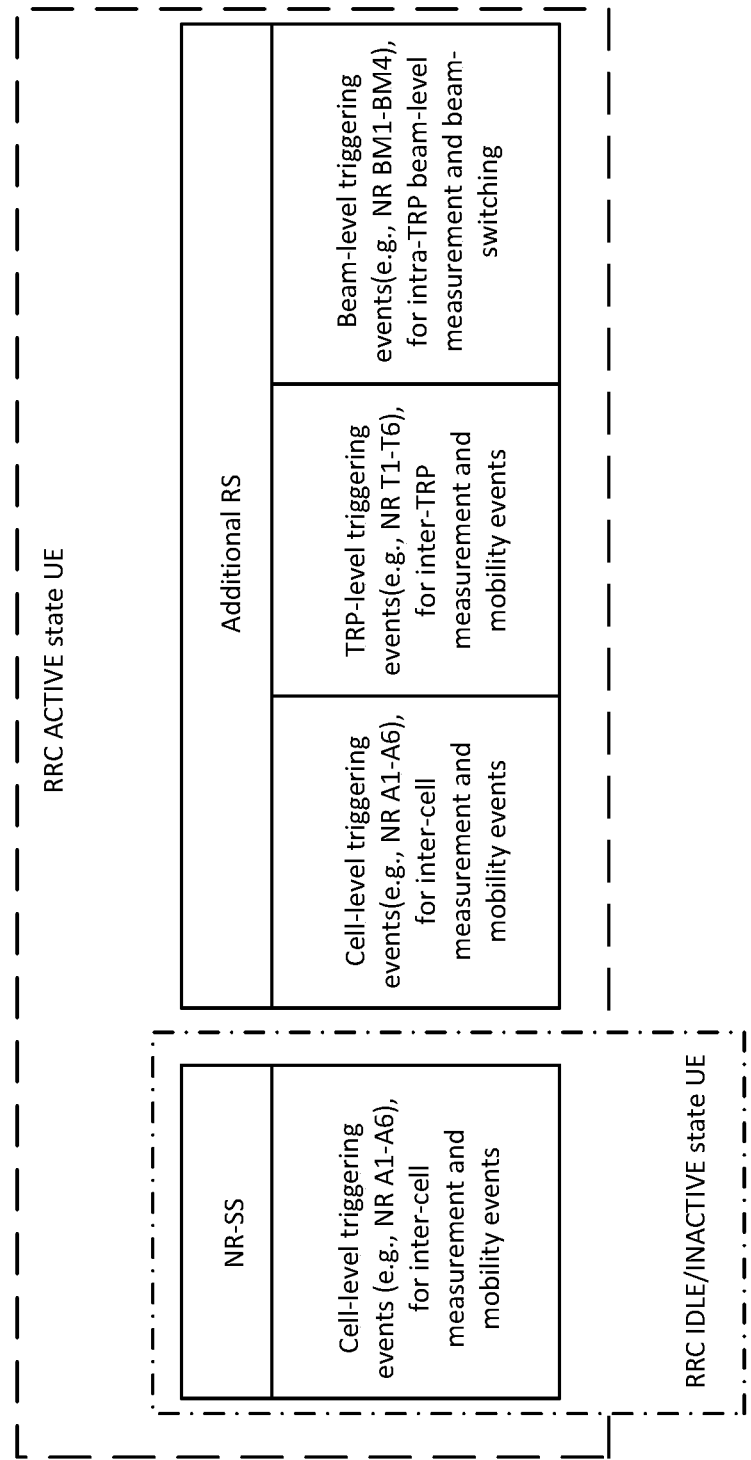
FIG. 14 is a diagram that shows an example of measurement triggering events for a UE in different states.
Figure 21:
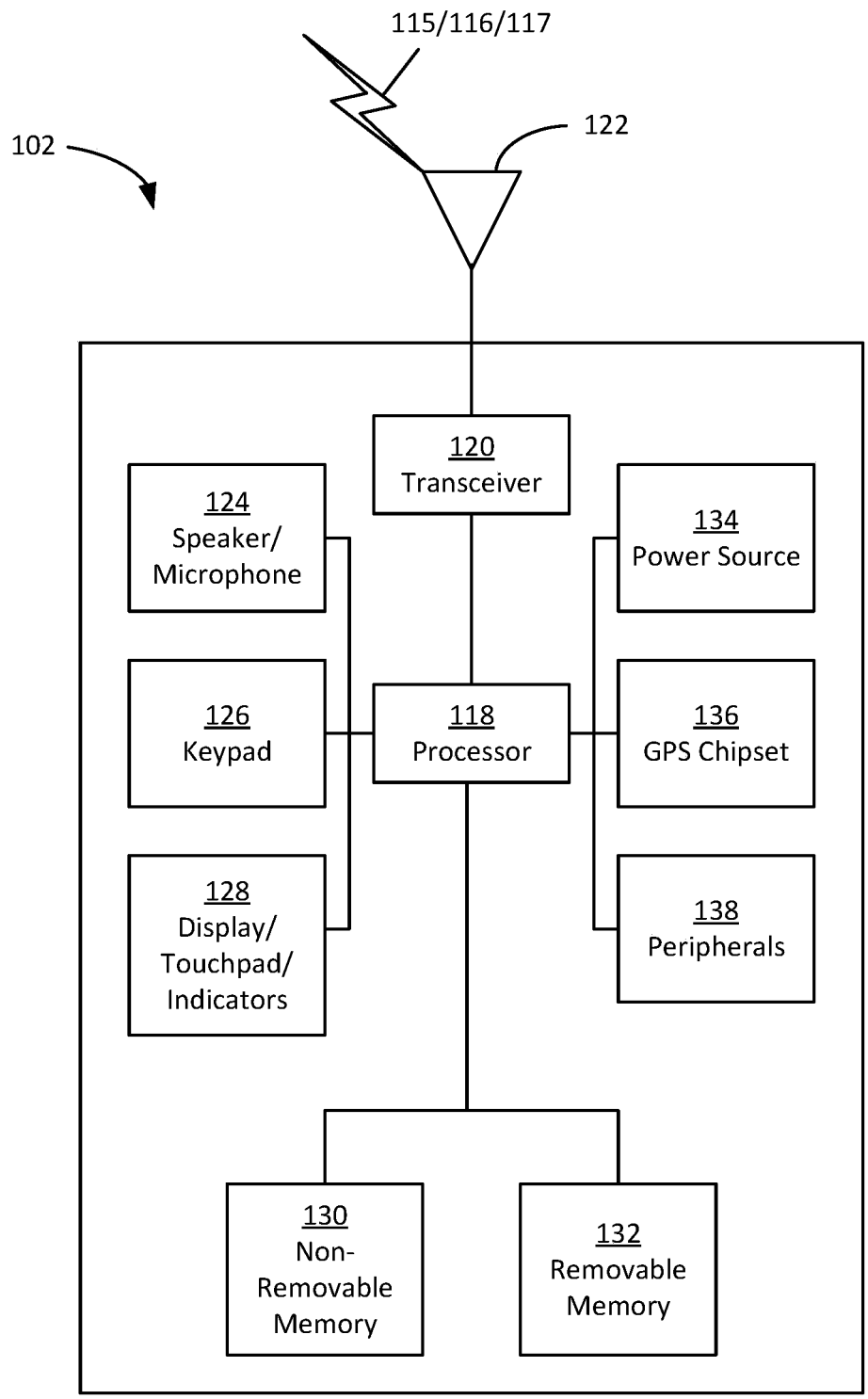
FIG. 21 is a block diagram of an example apparatus or device configured for wireless communications in accordance with the embodiments illustrated herein.
Figure 25:
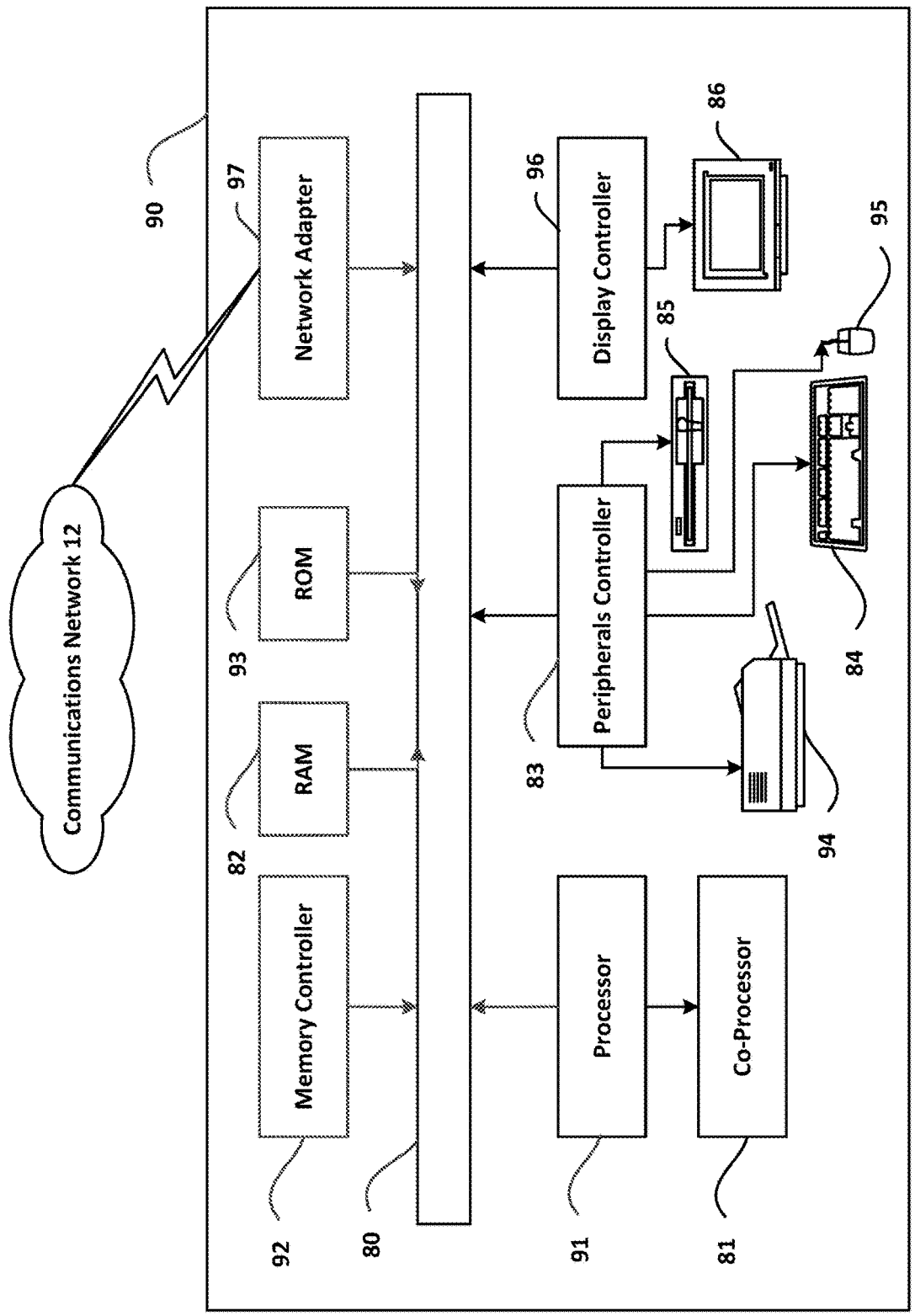
FIG. 25 is a block diagram of an example computing system in which one or more apparatuses of the communications networks illustrated in FIGS. 20, 22, 23, and 24 may be embodied.

It will be appreciated that the functionality illustrated in FIGS. 13-14 may be implemented in the form of software (e.g., computer-executable instructions) stored in a memory of, and executing on a processor of, a wireless device or other apparatus (e.g., a server, gateway, device, or other computer system), such as one of those illustrated in FIGS. 21 and 25.

For a UE in RRC_CONNECTED state, how to jointly evaluate the cell-level measure results and triggering may be determined by network configuration of the UE. For example, based on NR-SS measurement, a UE may first discover and make a list of neighboring cells, and then trigger further cell-level measurement where more accurate measurement results may be derived based on an additional scheduled RS.

{Report and Content}

A measurement report may be used to transfer measurement results from the UE to Network in the case of network controlled mobility, so that the network may decide whether and where to handover a UE to an appropriate cell. After a UE measures multiple beams from both serving cells and neighbor cells, there are a number of options for measurement reporting. In Report Option 1, a UE reports combined quality of multiple beams.

In Report Option 2, a UE reports individual beam (pair) measurement result. There may be some scenarios when RRC_CONNECTED state UE performs measurement based on only NR-SS and no beam level information is available. In those scenarios, this option is not possible. However, in this scenario, the UE may report individual SS-block measurement results, where each SS-block measurement may be identified by the time index of the SS block corresponding to the measurement.

In Report Option 3, a UE reports combined quality of multiple beams plus individual beam (pair) measurement results.

For Report Option 2, combined quality of multiple beams may be translated into cell-level or TRP-level quality representations. Recent 3GPP meetings already agreed that at least cell-level measurement results will be contained in the measurement report and beam-level measurement results may be optionally included. But inclusion of other report content is still an open question. Again take FIG. 13 as an example. When the RRC_CONNECTED UE travels along the bottom-up red trajectory. UE measures the network according to network configurations. Redundant/ping-pong handover may occur if only cell quality is taken into account during handover evaluation. For example, UE may handover to from cell1 (TRP2) to cell2 (TRP3) when UE is under more beam coverage of cell 2 (so cell 2 quality is better than cell 1 quality), and then handover back to cell1 (TRP1). Even when beam level measurement results are available to UE and network due to measurement of additional RS. However, if TRP level quality is available in measurement report, network may not decide to handover UE from cell1/TRP2) to cell2, TRP3 because network knows that TRP1 also has acceptable quality (may be lower combined quality than TRP3) and has the advantage of sharing the same gNB as TRP2. This may significantly minimize/save the context/data forwarding cost (in terms of signaling overhead and latency).

For Report Option 1, it may be necessary to consider several factors.

First, the radio environment change should be taken into account by network when configure UE whether to include individual beam (pair) measurement result in to measurement report. For example, user movement, angular rotation, and blocking cause variations in signal quality of beams transmitted from serving and neighboring cells/TRPs. In these highly volatile/dynamic radio environment, beams results may be expired sooner after the report has been sent out. For example, Beam quality, even beam index (due to rotation), is not accurate any more.

Second, a cell may cover a large area and involve a rather large number of TRPs. The beam results should provide a fair indication of where the UE is likely to appear in the target cell. This information seems useful for the network to know, e.g., when allocating dedicated RA resources. For example, the measurement report may include beam measurements that include the time index of the SS block thereby allowing the network to know which SS block(s) the UE may detect and therefore, which RA resources to use when allocating a dedicated preamble for handover.

Third, an obvious benefit of cell/TRP level report is that the signaling overhead is quite low. However, measurement report that contains only cell/TRP quality information may be insufficient for network in handover process since the network side has no idea of which beams are qualified. In handover command, the target cell/TRP cannot configure beam specific PRACH parameters for the UE. As a result, UE may only initiate contention based random access, based on the parameters read from system information or HO command, consuming more time than non-contention based random access.

Fourth, once the beam measurement results forwarded by the source cell/TRP to target cell/TRP, the target cell/TRP may better prepare DL TX beam via something like pre beam alignment instead of regular beam sweeping process. This may significantly reduce handover latency.

Furthermore, based on the beam information in the report, target cell/TRP may prepare assistance information for UE, like RACH resource, or DL/UL TX/RX beam pair to be used. This information may be forwarded by source cell/TRP to UE, and help the UE to identify optimal beam pair fast and reduce the data/message interruption time.

Those factors/situations may be translated into different groups of parameters in measurement configuration, so that a UE may quickly make local decisions which beams beam results, if any, may be included. Alternatively, these configurable groups of parameters may also be dynamically changed by the network as needed due to factors like real-time traffic load balancing, policy, deployment changes, etc.

A measurement report sent by UE may be configured to include flexible content, such as, for example: measurement results of N beams of a cell and or a TRP; average or summation of combined results of N beams of a cell and/or a TRP; and a number of beams of a cell and/or a TRP with quality above some configurable threshold values.

In Table 5, some example measurement report options. For some factors, the threshold/parameter values affecting/contained in the measurement report may be properly scaled/adjusted. For example, in the case of high UE mobility speed, the number of N may be smaller.

TABLE 5

Example measurement report options in NR

| Measurement report options | Pros. | Cons. |
| --- | --- | --- |
| A. Cell/TRP level measurements | Low signaling overhead | 1. Suboptimal target beam, 2. More time to set up RRC connection with target cell/TRP |

TABLE 5-continued

Example measurement report options in NR

| Measurement report options | Pros. | Cons. |
| --- | --- | --- |
| B. Cell/TRP level measurements + Number of N beams (e.g., best N beams of acceptable quality) | 1. Relatively low signaling overhead<br>2. Stable target cell/TRP to avoid ping-pong mobility events | Same with option A |
| C. Cell/TRP level measurements + Beam ID of N beams | 1. Optimal target beam,<br>2. Load balancing in target cell/TRP,<br>3. Save time for RRC connection setup in target cell/TRP | Medium signaling overhead |
| D. Cell/TRP level measurements + Beam ID + Individual beam quality of N beams | Same with option C | High signaling overhead. Beam quality may be unnecessary since beam ID of good beams may be already enough to assist network during handover process. |

Example B is an example NR MeasurementReport message. Example C is an example MeasResults IE. {see appendix} The NR MeasResults IE may optionally include a beamResultList field for the serving cell and/or the neighbor cells. The beamResultList may include just the beam Id's, which may be ordered according to the strength of the measurement quantity or the beamResultList may also include the measurement quantity for the reported beams.
{Measurement Object}

Measurement object is the object on which a UE may perform the measurements, e.g., frequencies and cells, and parameters associated with, for example, frequency or cell-specific offsets. In NR, due to the use of massive MIMO and beamforming, beams may be used popularly by various TRPs and cells. Typically, the narrower the beam is the higher gain the beam may provide. In order to provide adequate capacity, this would imply quite narrow beams and then a higher number of beams to cover a cell area. In the meantime, due to the fragileness of high frequency beamforming, even a small rotation or a little movement at the UE side may lead to beam change. These frequent beam changes in turn may trigger frequent UE measurements according to the defined trigger events. For these reasons, huge measurement overhead on UE may be existed in NR networks.

To reduce measurement cost from both energy and latency perspective (for single radio UE, measurement may also cause data/message transmission interruptions), measurement objects configured on a UE need to be limited to reduce UE measurement effort. For example, UE may be configured to measure only subset of beams, cells, TRPs or/and frequencies, instead of full beam sweeping period of all cells/ TRPs/frequencies. From network operation perspective, some TRPs/Cells may be configured to be active only for specific situations (e.g., rush hours use only such as sports, holiday, etc.). Additional RS may be turned on temporarily, for example as part of handover preparation. In other words, measurement objects configured to a UE should be flexible and configurable, and a measurement object is only configured when the measurement for the UE is necessary.

One solution to configure subset of beams or/and TRPs for UE measurement is by exchanging subset information between adjacent TRPs/cells. The subset information may contain NR-SS information (e.g., periodicity, etc.) of neighboring cells and frequencies, additional RS beam information (e.g., beam ID, width, resources, loading level, etc.) and neighboring TRPs/cells' traffic load, etc. NR-SS and cell information are for all UEs (IDLE, INACTIVE, CONNECTED), while additional RS and TRP information are for CONNECTED UE only. The adjacent TRPs/cells may belong to the same or different cells/gNBs. When UE measurement is triggered by events, serving TRP/cell may inform neighbor TRP/cells (e.g., over X2 interface) about the UE location information and send a request for beam information of the neighbor TRP/cells. With the UE's location information, neighbor TRP/cells may select a subset of beams/TRPs close to UE, and send the subset back to serving TRP/cell, and finally serving TRP/cell may forward the whole subset or part of the subset back to UE for later measurement. Alternatively, instead of on-demand request, neighbor TRP/cells may deliver the beam information to the serving TRP/cells periodically or whenever the beam sweeping pattern or the RS (NR-SS or/and additional RS) resources have changed.

The measurement configuration may include a parameter controlling when the UE is required to perform neighbor cell measurements. We refer to this parameter as S-measure. S-measure may correspond to a PCell quality threshold that is compared with the derived cell quality of the PCell. The UE would be required to perform neighbor cell measurements when the derived PCell quality is below S-measure. Idle mode RS and/or additional RS based measurements may be used to derive the PCell quality that is used when determining when the UE is required to perform neighbor cell measurements. The measurement type to use; e.g., NR-SS or CSI-RS based, may be specified per the standard or signaled by the network via higher signaling; e.g., RRC signaling. Alternatively, both NR-SS and CSI-RS based PCell quality may be derived and used to make a joint decision. For example, the UE may be configured such that neighbor cell measurements are required if either the NR-SS or CSI-RS based cell quality is below S-measure. Alternatively, the UE may be configured such that measurements are required if both the NR-SS and CSI-RS based cell quality are below S-measure. The network may configure the UE with a single S-measure parameter that may be used for NR-SS and/or CSI-RS based measurements. Alternatively, separate NR-SS and CSI-RS based thresholds may be configured; e.g., s-Measure and csi-s-Measure.

For NR, metrics other than the derived PCell quality may also be used to control when the UE is required to perform neighbor cell measurements. For example, the UE may trigger neighbor cell measurements when the number of suitable serving cell beams is below a threshold. A suitable beam may be a beam whose measurement quantity is above a specified threshold. The threshold used to determine if a beam is suitable may be the same as s-Measure or csi-s-Measure. Alternatively, a separate threshold(s) may be used to determine if a beam is suitable. The network may configure the UE with a single threshold for the number of suitable beams that may be used for NR-SS and/or CSI-RS based measurements; e.g., s-Measure-beams. Alternatively, separate NR-SS and CSI-RS based thresholds may be configured; e.g., s-Measure-beams and csi-Measure-beams. Such criteria could be configured in combination with the s-Measure and/or csi-s-Measure criteria. For example, if s-Measure and s-Measure-beams were both configured, the UE would be required to perform neighbor cell measurements if the derived cell quality was below s-Measure or the number of suitable beams was below s-Measure-beams. An example MeasConfig IE that includes such parameters is shown in Example D. {see appendix}

The derived cell quality and number of beams above a threshold may be determined from points J and K respectively of the measurement model shown in FIG. 8 or from points D and F, respectively, of the alternate measurement model shown in FIG. 17.

The MeasConfig IE includes an optional quantityConfig field that may be used to define the measurement quantities and associated filtering used for all event evaluation and related reporting of configured measurements. For NR, the measurement quantities may be based on idle mode RS; e.g., NR-SS, and/or additional RS; e.g., CSI-RS. Furthermore, the measurement quantities may be at a cell level or a beam level. The QuantityConfig IE shown in Example E {see appendix} may be used to configure the NR measurement quantities and associated filtering. The parameters without the csi prefix are used to configure the idle mode RS based measurement quantities; e.g., NR-SS, while the parameters with the csi prefix are used to configure the additional RS based measurement quantities: e.g., CSI-RS. The first set of parameters are for the cell level measurement quantities, while the second set are for the beam level measurement quantities. The presence or absence of a specific parameter in the IE may be used to indicate whether or not the associated measurement quantity is configured.

The MeasConfig IE includes an optional measObject-ToAddModList field that may include an NR measurement configuration such as the example MeasObjectNR IE shown in example F. {see appendix} The MeasObjectNR IE may include fields to configure the number beams used in the cell quality derivation and a threshold the beam measurement must be above to be used in the cell quality derivation. Similarly, the MeasObjectNR IE may also include parameters to configure the maximum number of beams X to consider for event detection and/or inclusion in the measurement report, and a threshold the beam measurement must be above to be considered for event detection and/or included in the measurement report. The same configuration may be used for idle mode RS and additional RS based measurements. Alternatively, the UE may be configured independently for idle mode RS and additional RS based measurements; e.g., an additional set of fields with a csi-prefix may be optionally included in the IE to configure CSI-RS based cell quality derivation and beam level event detection and reporting. Example G is a MeasObjectToAddModList Information Element.

{Measurement Procedures}

Figure 15:
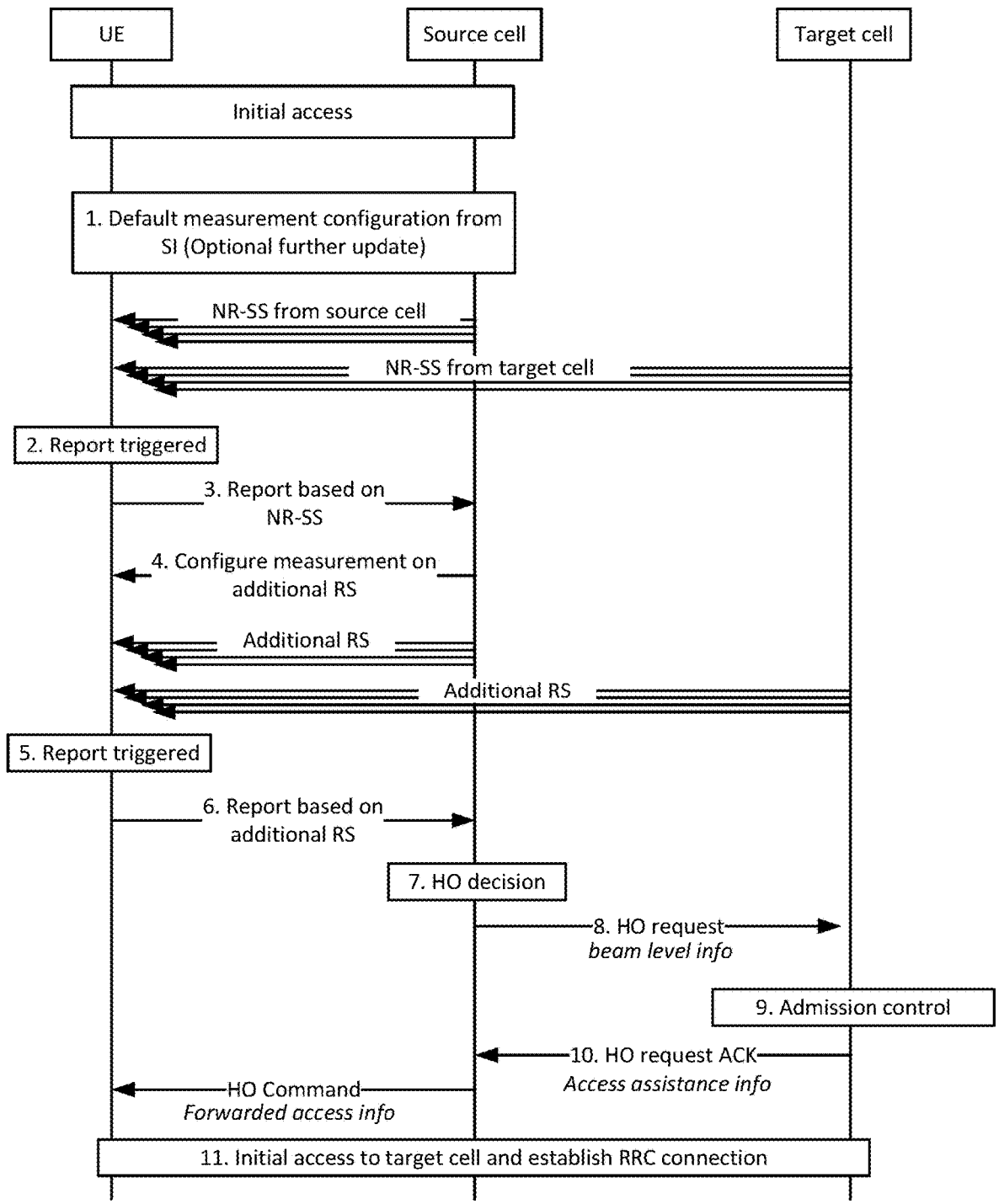
FIG. 15 is a call flow diagram that shows an example signaling flow of NR inter-cell handover.

Example signaling flow for NR DL measurement based inter-cell handover procedure is shown in FIG. 15. During initial access, the UE may perform cell selection and registration with the network. Following initial access, UE may perform measurement configuration and measurement procedures.

In step 1 of FIG. 15, default measurement configuration (e.g., object to measure, frequencies, cells, NR-SS periodicity, etc.) may be offline preconfigured or obtained from System Information (e.g., Other SI). Alternatively, UE may optionally obtain updated configurations that complements the default configuration (e.g., on demand request of Other SI which includes updated measurement configurations, or over dedicated signaling). The MeasConfig IE defined above may be used to configure the NR measurements.

In step 2 of FIG. 15, UE performs beam level measurements in source cell and target cell based on cell specific beam reference signals (e.g., NR-SS specified in measurement configurations) and derives single value of cell level quality by configuring proper combination algorithm in measurement model (see measurement model, filtering design, and the alternate NR measurement model described above). If the UE us configured with criteria to control when neighbor cell measurements are performed; e.g., s-Measure, csi-s-Measure, s-detected-beams, then the neighbor cell measurements are only performed when the criteria are met as described above under measurement object. The measurement results are evaluated to see if any defined triggering event would be triggered.

In step 3 of FIG. 15, upon triggering a measurement reporting event based on NR-SS, UE provides the RRC level report to the source cell. As NR-SS is cell specific, it may provide only cell level differentiation so that only the cell measurements is included in the measurement report. Alternatively, the UE may be configured to also report beam level measurement based on NR-SS measurements, where the beam level measurement results in the report may include the beam Id's; e.g., the time index of the SS block, which may be ordered according to the strength of the measurement quantity. The reported beam level measurements may also include the actual measurement quantity; e.g., SS-block-RSRP, SS-block-RSRQ. The NR measurements may be reported using the NR MeasResults IE signaled via the NR MeasurementReport message as described above under report and content.

In step 4 of FIG. 15, based on the NR-SS measurement report, source cell configures the UE to perform further measurements (e.g., a subset of additional RS corresponding to beams in one or multiple TRPs/cells) for more accurate measurement results. The further measurements may be configured using the QuantityConfig IE defined above under measurement object. Measurement results based on NR-SS may be aggregated SS-block measurement quantities (from same or different TRPs) and may not reflect actual cell quality during data transmission (when only single TRP is selected as the serving TRP).

In step 5 of FIG. 15, in addition to performing measurements on the NR-SS, the UE performs cell and/or beam level measurements on the newly configured additional RS from one or multiple neighboring TRPs/Cells as well as the serving cell. The measurement results are evaluated to see if any defined triggering event would be triggered. Triggering events evaluated here may or may not be the same as the events evaluated in step 2. For example, triggering events may be defined differently for NR-SS and additional RS.

In step 6 of FIG. 15, upon triggering a measurement reporting event based on additional RS, UE provides the RRC level report to the source cell, where the measurements may be reported using the NR MeasResults IE signaled via the NR MeasurementReport message as described above under report and content. In addition to cell quality, UE reports beam measurements of source and target cell. Beam information may consist of a beam identification (Beam ID or Beam index) and a signal level, such as RSRP. Alternatively, in case UE has provided beam level information via beam management procedure to the serving cell (e.g., to facilitate intra-cell mobility/mobility without RRC involvement), UE may not need to report serving cell beam measurements as these may be already available at source via L1/L2 signaling. The UE may also include cell level measurement quantities based on the NR-SS in the report if available.

In step 7 of FIG. 15, once source cell have received UE measurement report, it may utilize the beam measurements to determine whether to handover UE to another cell (in this example figure, to the target cell). Providing only cell level measurement results may give limited information for source cell to make handover decisions. Using beam measurements on both source and target cell (or multiple potential target cells) may determine, e.g., number of qualified beams (e.g., non-correlated beams with quality above a threshold) in target cell and compare to the current availability on serving cell and other measured neighboring cells. Multiple qualified beams may provide scheduling flexibility to network (e.g., in case hybrid/analogue beamforming is used) and it may ensure serving cell connectivity robustness.

In step 8 of FIG. 15, after handover (HO) decision, beam level measurements are forwarded to the target cell, e.g., in a HO request. These measurements may be used by the target cell to reserve resources for RACH access corresponding to the reported beams, e.g., assign contention free RACH resources that would be beam specific. In addition, target cell may prepare DL TX beam (target cell knows which DL TX beam is best for UE from the reported beam level information) via something like pre beam pairing instead of regular beam sweeping process. This may significantly reduce handover latency.

In step 9 of FIG. 15, target cell performs admission control and provides the RRC configuration, where access assistance information may be included. The access assistance info may include the selected beam pair(s) for UE, assigned C-RNTI and random access parameters.

In step 10 of FIG. 15, target cell forwards the access assistance info in a HO request ACK message via Xn. UE receives the configuration via source cell. Assigning contention free RACH resources for UE potentially minimizing delays in completing the HO procedure In step 11 of FIG. 15, once the assistance information is forwarded to UE from source cell, UE may initiate random access on configured beam pair(s) and moves the connection to the target cell via RRC.

It is understood that the entities performing the steps illustrated in FIG. 15 may be logical entities that may be implemented in the form of software (e.g., computer-executable instructions) stored in a memory of, and executing on a processor of, an apparatus configured for wireless and/or network communications or a computer system such as those illustrated in FIGS. 21 and 25. That is, the method(s) illustrated in FIG. 15 may be implemented in the form of software (e.g., computer-executable instructions) stored in a memory of an apparatus, such as the apparatus or computer system illustrated in FIGS. 21 and 25, which computer executable instructions, when executed by a processor of the apparatus, perform the steps illustrated in FIG. 15. It is also understood that any transmitting and receiving steps illustrated in FIG. 15 may be performed by communication circuitry of the apparatus under control of the processor of the apparatus and the computer-executable instructions (e.g., software) that it executes.

Figure 16:
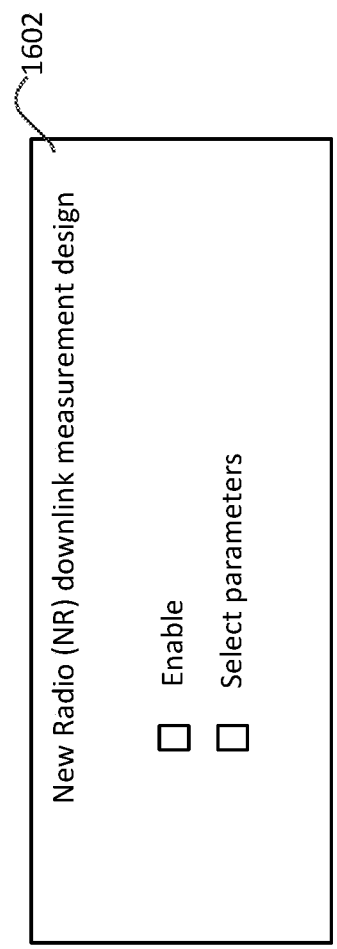
FIG. 16 is a diagram of an example Graphical User Interface (GUI).

Interfaces, such as Graphical User Interfaces (GUIs), may be used to assist user to control and/or configure functionalities related to downlink measurement design in new radio (NR). FIG. 16 is a diagram that illustrates an interface 1602 that allows a user to input parameters corresponding to an index value. It is to be understood that interface 1602 may be produced using displays such as those shown in FIGS. 21 and 25.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 20:
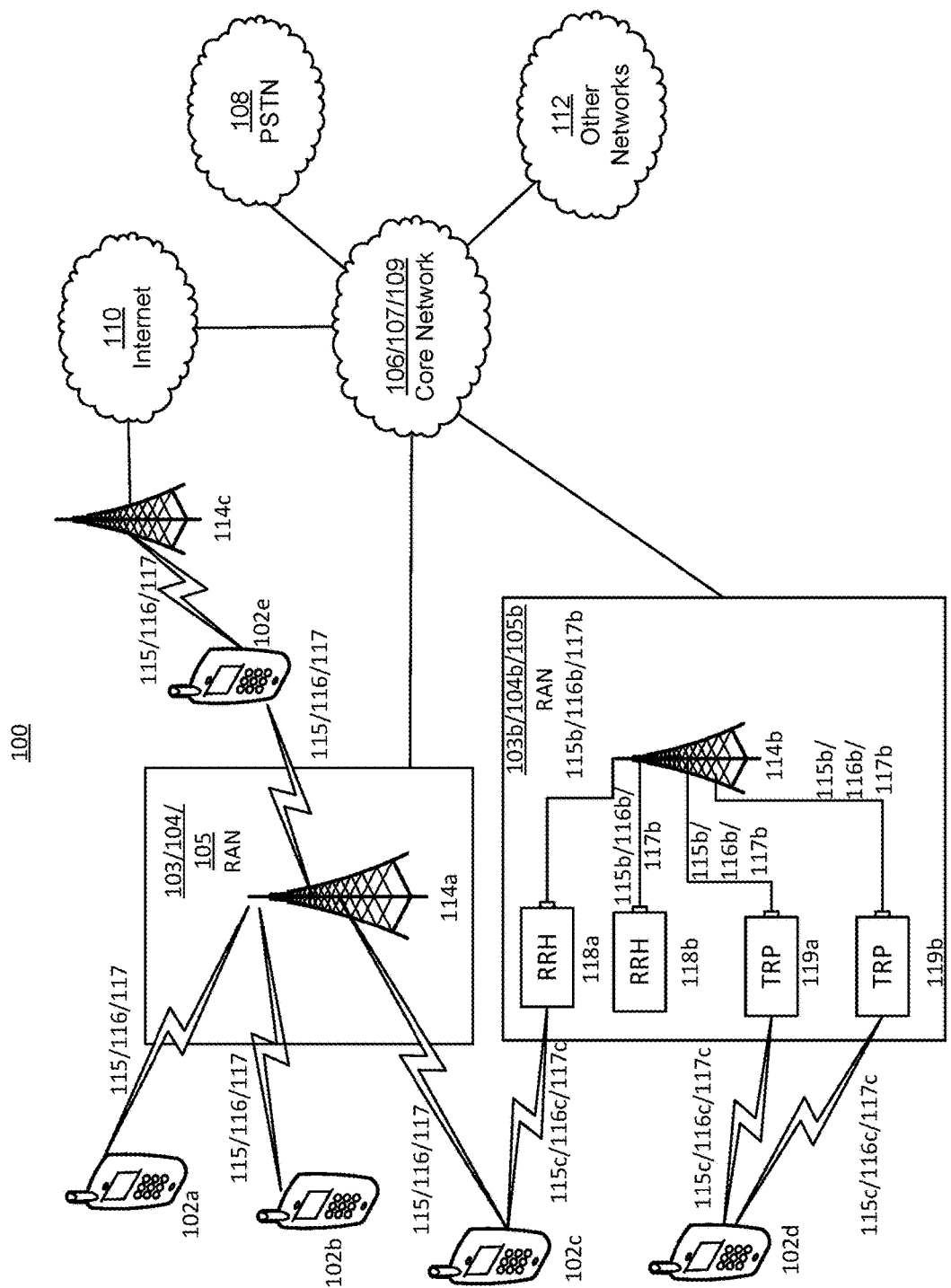
FIG. 20 illustrates one embodiment of an example communications system in which the methods and apparatuses described and claimed herein may be embodiment.

FIG. 20 illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, and/or 102*d* (which generally or collectively may be referred to as WTRU 102), a radio access network (RAN) 103/104/105/103*b*/104*b*/105*b*, a core network 106/

107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b. 102c, and 102d may be any type of apparatus or device configured to operate and/or communicate in a wireless environment. Although each WTRU 102a, 102b, 102c, and 102d is depicted in FIGS. 20-24 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include abase station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wiredly and/or wirelessly interface with at least one of the RRHs (remote radio heads) 118a, 118b and/or TRPs (transmission and reception points) 119a, 119b to facilitate access to one or more communication networks, such as the core network 106/107/109, the Internet 110, and/or the other networks 112. RRHs 118a, 118b may be any type of device configured to wirelessly interface with at least one of the WTRUs 102c, to facilitate access to one or more communication networks, such as the core network 106/107/109, the Internet 110, and/or the other networks 112. TRPs 119a, 119b may be any type of device configured to wirelessly interface with at least one of the WTRUs 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC) a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, and 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, and 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 20 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 20, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 20, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a. 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (1P) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105 or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 20 may be configured to communicate with the base station 114a, which may employ a cellular-based radio technology, and with the base station 114c, which may employ an IEEE 802 radio technology.

FIG. 21 is a block diagram of an example apparatus or device configured for wireless communications in accordance with the embodiments illustrated herein, such as for example, a WTRU 102. As shown in FIG. 21, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 21 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 20, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS), The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 20 may be configured to communicate with the base station 114a, which may employ a cellular-based radio technology, and with the base station 114b, which may employ an IEEE 802 radio technology.

FIG. 21 is a block diagram of an example apparatus or device configured for wireless communications in accordance with the embodiments illustrated herein, such as for example, a WTRU 102. As shown in FIG. 21, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 21 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 21 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 22:
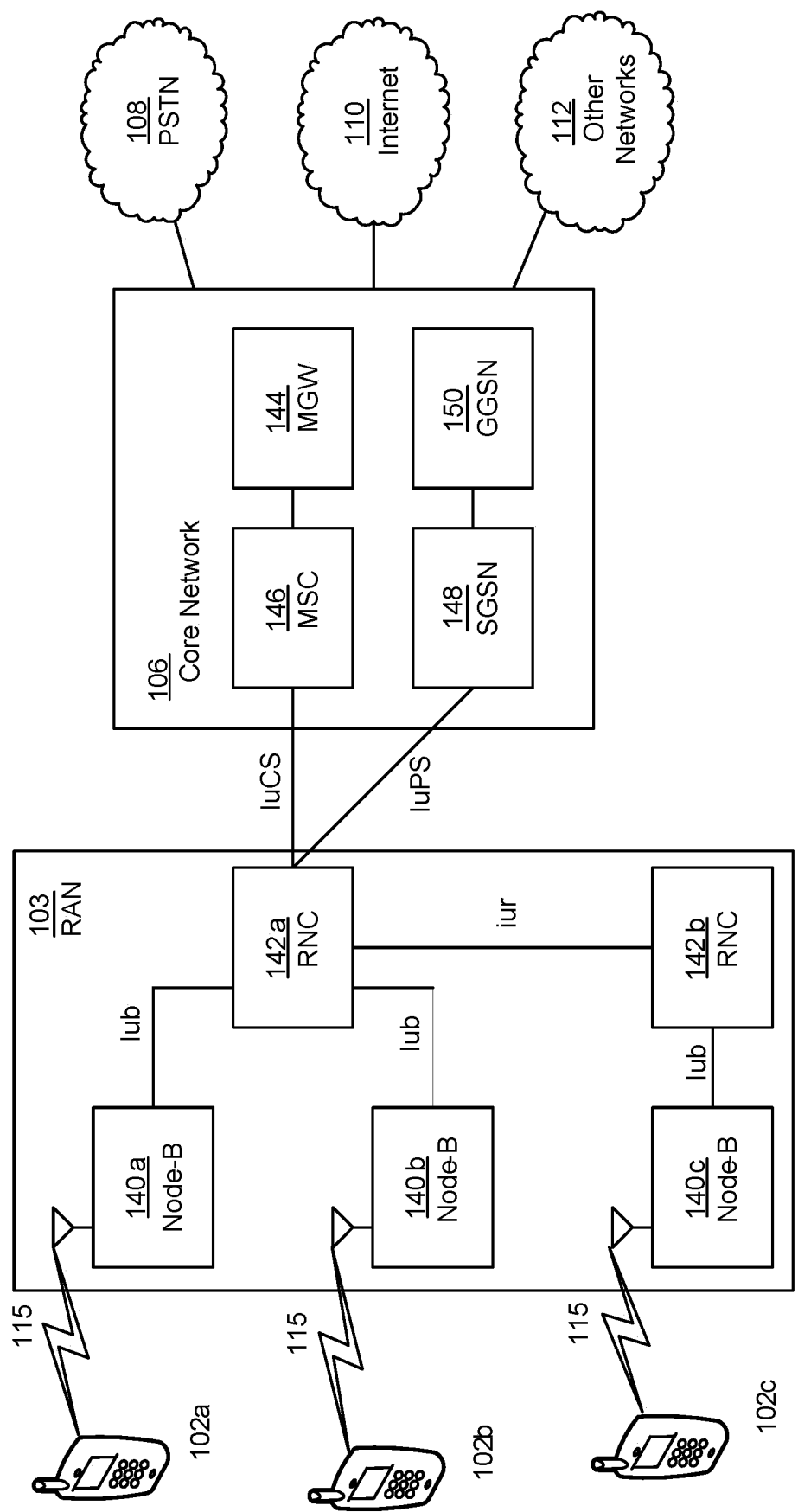
FIG. 22 is a system diagram of the RAN and the core network according to an embodiment.

FIG. 22 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 22, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 22, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 22 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MOW 144. The MSC 146 and the MGW 144 may provide the WTRUs 102a, 102b, 102c with access to circuit-switched networks, such as the PSTN 108, to facilitate communications between the WTRUs 102a, 102b, and 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 23:
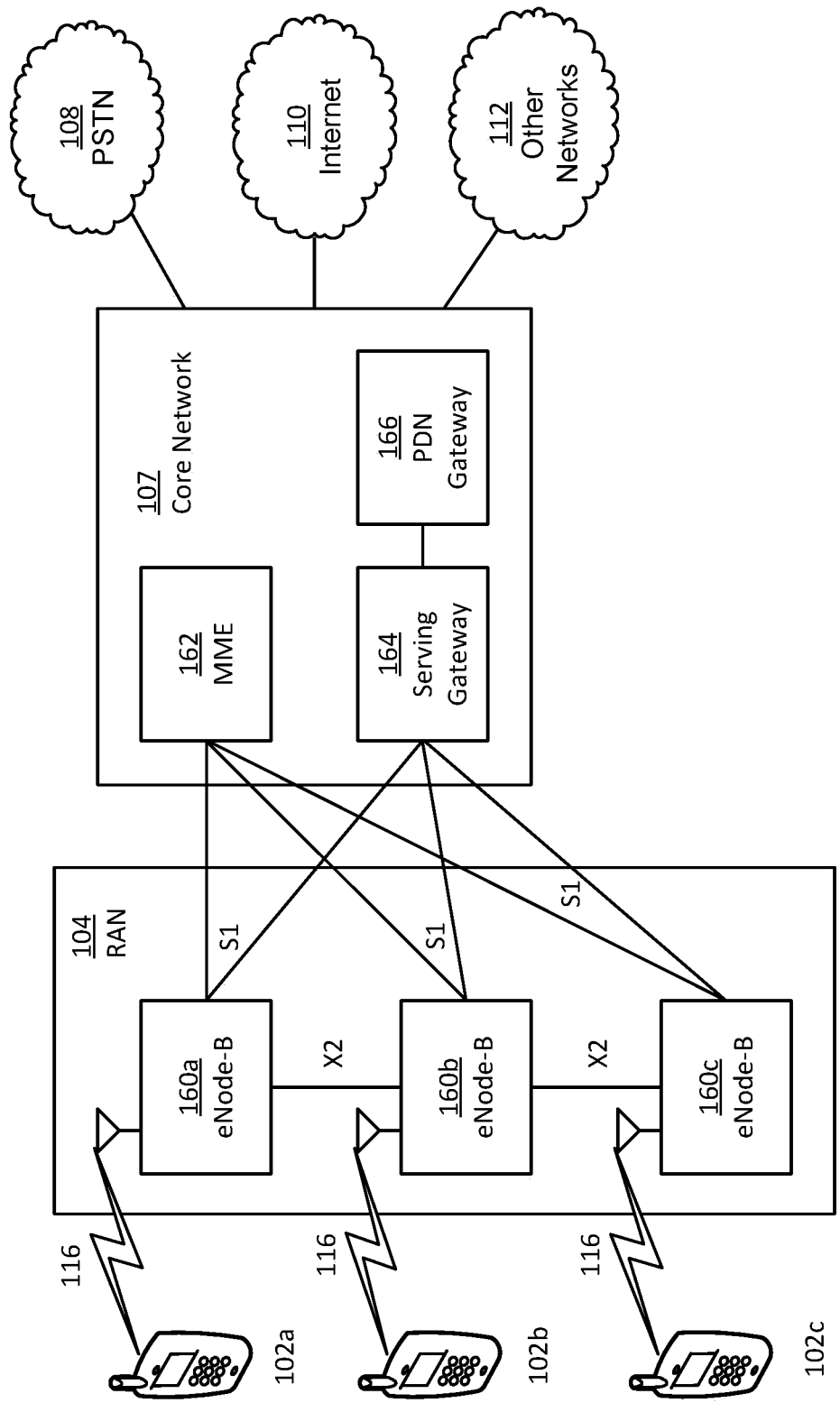
FIG. 23 is a system diagram of the RAN and the core network according to another embodiment.

FIG. 23 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160s, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 23, the eNode-Bs 160a, 160b, 160c may communicate with one another over an X2 interface.

The core network 107 shown in FIG. 23 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the SI interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 24:
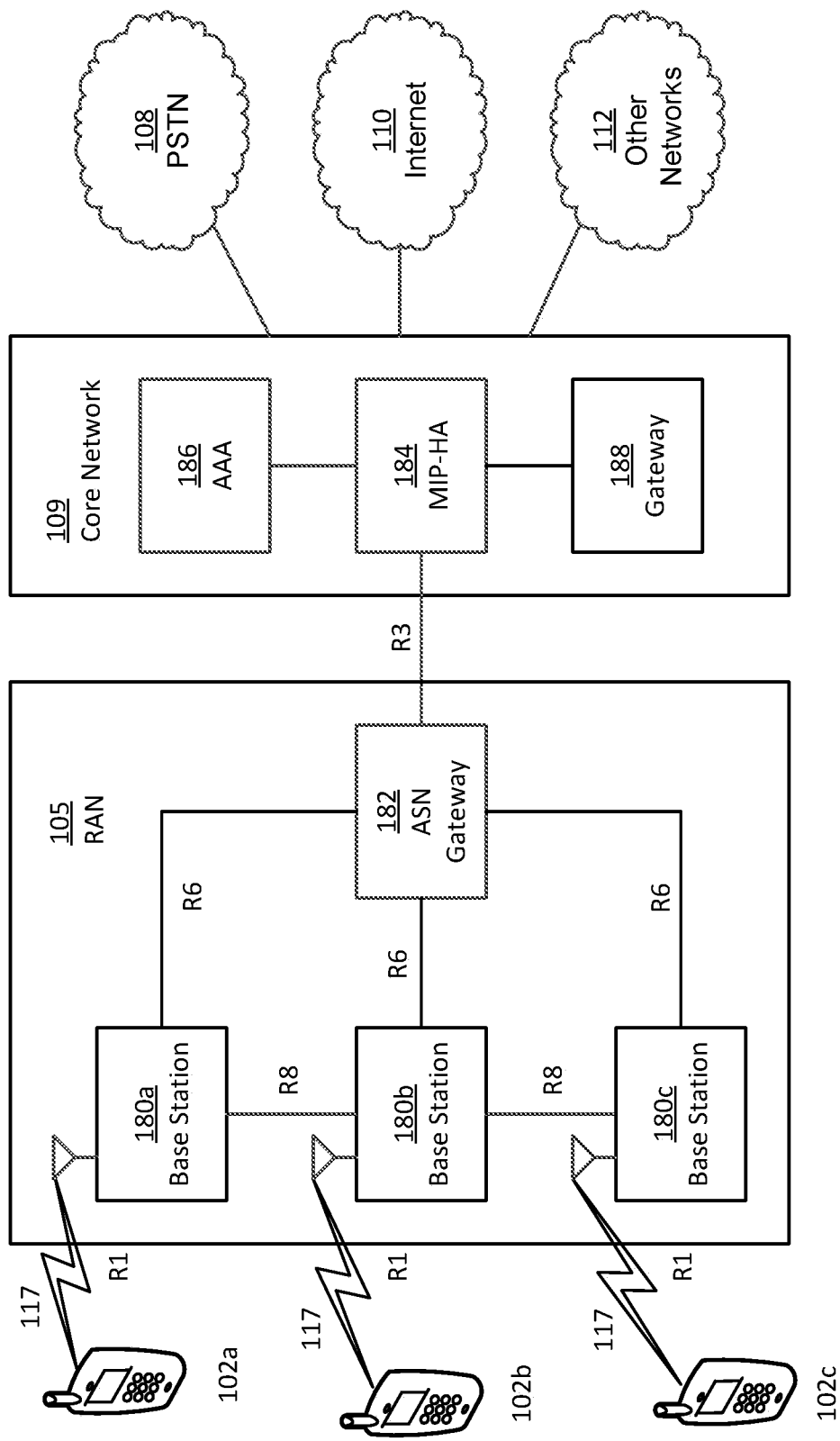
FIG. 24 is a system diagram of the RAN and the core network according to yet another embodiment.

FIG. 24 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b. 102c, the RAN 105, and the core network 109 may be defined as reference points.

As shown in FIG. 24, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, and 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c, and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a. 180b, 180c and the ASN gateway 182 may be defined as an R6 reference point. The R6 reference point may include protocols for facilitating mobility management based on mobility events associated with each of the WTRUs 102a, 102b, and 102c.

As shown in FIG. 24, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, and 102c with access to packet-switched networks, such as the Internet 110, to facilitate communications between the WTRUs 102a, 102b, 102c, and IP-enabled devices. The AAA server 186 may be responsible for user authentication and for supporting user services. The gateway 188 may facilitate interworking with other networks. For example, the gateway 188 may provide the WTRUs 102a, 102b, and 102c with access to circuit-switched networks, such as the PSTN 108, to facilitate communications between the WTRUs 102a, 102b, and 102c and traditional land-line communications devices. In addition, the gateway 188 may provide the WTRUs 102a, 102b, and 102c with access to the networks 112, which may include other wired or wireless networks that are owned and/or operated by other service providers.

Although not shown in FIG. 24, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 20, 22, 23, and 24 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 20-24 are provided by way of example only, and it is understood that the subject matter disclosed and claimed herein may be embodied or implemented in any similar communication system, whether presently defined or defined in the future.

FIG. 25 is a block diagram of an example computing system 90 in which one or more apparatuses of the communications networks illustrated in FIGS. 20, 22, 23, and 24 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 2 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as, for example, a network adapter 97, that may be used to connect computing system 90 to an external communications network, such as the RAN 103/104/105, Core Network 106/107/109, PSTN 108, Internet 110, or Other Networks 112 of FIGS. 20-24 to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX

Example A

*NR MeasGapConfig* Information Element

```
-- ASN1START
MeasGapConfig ::=              SEQUENCE {
    gapOffset                  CHOICE {
        gp0                        INTEGER (0..39),
        gp1                        INTEGER (0..79),
        gp2                        INTEGER (0..159),
        gp3                        INTEGER (0..39),
        gp4                        INTEGER (0..79),
        gp5                        INTEGER (0..159),
        gp6                        INTEGER (0..39),
        gp7                        INTEGER (0..79),
        gp8                        INTEGER (0..159)
    },
    alignWithBurstSeries       BOOLEAN,             OPTIONAL
    incrementalGap             BOOLEAN              OPTIONAL
}
-- ASN1STOP
```

APPENDIX

Example B

*NR MeasurementReport Message*

```
-- ASN1START

MeasurementReport ::=        SEQUENCE {
    measurementReport        MeasResults
}

-- ASN1STOP
```

APPENDIX

Example C

*NR MeasResults* Information Element

```
-- ASN1START
MeasResults ::=            SEQUENCE {
    measId                 MeasId,
    measResultPCell        SEQUENCE {
        rsrpResult         RSRP-Range,
        rsrqResult         RSRQ-Range,
        csi-rsrpResult         CSI-RSRP-Range         OPTIONAL,
        csi-rsrqResult         CSI-RSRQ-Range         OPTIONAL,
        beamMeasResultsList        BeamMeasResultsList        OPTIONAL
    },
    measResultNeighCells   CHOICE {
        measResultsListNR         MeasResultsListNR,
        measResultListEUTRA           MeasResultListEUTRA,
        measResultListUTRA    MeasResultListUTRA,
        measResultListGERAN           MeasResultListGERAN,
        measResultsCDMA2000           MeasResultsCDMA2000,
        ...
```

APPENDIX
Example C - continued

```
    },                              OPTIONAL,

{ other measurements }
}
MeasResultListNR ::=        SEQUENCE (SIZE (1..maxCellReport)) OF MeasResultNR MeasResultNR ::=            SEQUENCE {
    physCellId                  PhysCellId,
    cgi-Info                    SEQUENCE {
        cellGlobalId                CellGlobalIdEUTRA,
        trackingAreaCode            TrackingAreaCode,
        plmn-IdentityList           PLMN-IdentityList2         OPTIONAL
    }                                                          OPTIONAL,
    measResult                  SEQUENCE {
        rsrpResult                  RSRP-Range                 OPTIONAL,
        rsrqResult                  RSRQ-Range                 OPTIONAL,
        csi-rsrpResult              CSI-RSRP-Range             OPTIONAL,
        csi-rsrqResult              CSI-RSRQ-Range             OPTIONAL,
```

APPENDIX
Example C - continued

```
        beamMeasResultsList          BeamMeasResultsList         OPTIONAL ( other measurements )
    }
}

MeasCSI-RS-Id-NR ::=        INTEGER (1..maxCSI-RS-Meas-NR)

BeamMeasResultListNR ::=    SEQUENCE (SIZE (1..maxBeamReport)) OF BeamMeasResult BeamMeasResult ::=          CHOICE {
    beamMeas                SEQUENCE {
        beamId              INTEGER(1..maxSSBLocks),
        rsrpResult          RSRP-Range,                 OPTIONAL,
        rsrqResult          RSRQ-Range,                 OPTIONAL
    }
```

APPENDIX

Example C - continued

```
  csiBeamMeas              SEQUENCE {
    beamId                   MeasCSI-RS-Id-NR),
    csi-rsrpResult              CSI-RSRP-Range,       OPTIONAL,
    csi-rsrqResult              CSI-RSRQ-Range,       OPTIONAL
  }
} maxBeamReport        INTEGER ::= 32   -- Maximum number of reported beams
maxCSI-RS-Meas-NR    INTEGER ::= 96   -- Maximum number of entries in the CSI-RS list
                                      -- in a measurement object
maxSSBlocks          INTEGER ::= 64   -- Maximum number of SS blocks in an SS burst set

-- ASN1STOP
```

APPENDIX

Example D

*MeasConfig* Information Elements

```
-- ASN1START

MeasConfig ::=              SEQUENCE {
    -- Measurement objects
    measObjectToRemoveList      MeasObjectToRemoveList      OPTIONAL,   -- Need ON
    measObjectToAddModList      MeasObjectToAddModList      OPTIONAL,   -- Need ON -- Reporting configurations
    reportConfigToRemoveList    ReportConfigToRemoveList    OPTIONAL,   -- Need ON
    reportConfigToAddModList    ReportConfigToAddModList    OPTIONAL,   -- Need ON -- Measurement identities
    measIdToRemoveList          MeasIdToRemoveList          OPTIONAL,   -- Need ON
    measIdToAddModList          MeasIdToAddModList          OPTIONAL,   -- Need ON
```

APPENDIX

Example D - Continued

```
-- Other parameters
quantityConfig              QuantityConfig              OPTIONAL,   -- Need ON
measGapConfig               MeasGapConfig
s-Measure                   RSRP-Range                  OPTIONAL,   -- Need ON
s-Measure-beams             INTEGER(1..32)              OPTIONAL
csi-s-Measure               CSI-RSRP-Range              OPTIONAL,
csi-s-Measure-beams         INTEGER(1..32)              OPTIONAL
preRegistrationInfoHRPD     PreRegistrationInfoHRPD     OPTIONAL,   -- Need OP
speedStatePars          CHOICE {
    release                 NULL,
    setup                   SEQUENCE {
        mobilityStateParameters     MobilityStateParameters,
        timeToTrigger-SF            SpeedStateScaleFactors
    }
}                                                       OPTIONAL,   -- Need ON
{ other parameters }
}
-- ASN1STOP
```

APPENDIX

Example E

*QuantityConfig* Information Element

```
-- ASN1START

QuantityConfig ::=          SEQUENCE {
    quantityConfigNR          QuantityConfigNR          OPTIONAL,   -- Need ON
    quantityConfigEUTRA       QuantityConfigEUTRA       OPTIONAL,   -- Need ON
    quantityConfigUTRA        QuantityConfigUTRA        OPTIONAL,   -- Need ON
    quantityConfigGERAN       QuantityConfigGERAN       OPTIONAL,   -- Need ON
    quantityConfigCDMA2000    QuantityConfigCDMA2000    OPTIONAL,   -- Need ON
}

QuantityConfigNR ::=        SEQUENCE {
    -- Cell quality filter
    filterCoefficientRSRP     FilterCoefficient         DEFAULT fc4,
    filterCoefficientRSRQ     FilterCoefficient         DEFAULT fc4,
    csi-filterCoefficientRSRP FilterCoefficient         OPTIONAL,
    csi-filterCoefficientRSRQ FilterCoefficient         OPTIONAL,
```

APPENDIX

Example E - Continued

```
-- Beam filter
filterCoefficientBeamRSRP        FilterCoefficient        OPTIONAL,
filterCoefficientBeamRSRQ        FilterCoefficient        OPTIONAL
csi-filterCoefficientBeamRSRP    FilterCoefficient        OPTIONAL,
csi-filterCoefficientBeamRSRQ    FilterCoefficient        OPTIONAL
}

-- ASN1STOP
```

APPENDIX

Example F

*MeasObjectNR* Information Element

```
-- ASN1START

MeasObjectNR ::=              SEQUENCE {
    carrierFreq               ARFCN-ValueEUTRA,
    allowedMeasBandwidth      AllowedMeasBandwidth,
    presenceAntennaPort1      PresenceAntennaPort1,
    neighCellConfig           NeighCellConfig,
    offsetFreq                Q-OffsetRange            DEFAULT dB0,
    numBeamsForCellQuality    INTEGER(1..16)           OPTIONAL,
    beamThreshForCellQuality  RSRP-Range               OPTIONAL,
    numBeamsForReporting      INTEGER(1..16)           OPTIONAL,
    beamThreshforReporting    RSRP-Range               OPTIONAL, -- Cell list
    cellsToRemoveList         CellIndexList            OPTIONAL,    -- Need ON
    cellsToAddModList         CellsToAddModList        OPTIONAL,    -- Need ON
```

APPENDIX
Example F - Continued

```
-- Black list
blackCellsToRemoveList          CellIndexList           OPTIONAL,       -- Need ON
blackCellsToAddModList          BlackCellsToAddModList  OPTIONAL,       -- Need ON
cellForWhichToReportCGI         PhysCellId              OPTIONAL,       -- Need ON { other parameters }
}
```

APPENDIX

Example G

*MeasObjectToAddModList* Information Element

```
-- ASN1START
MeasObjectToAddModList ::=      SEQUENCE (SIZE (1..maxObjectId)) OF MeasObjectToAddMod
MeasObjectToAddMod ::=  SEQUENCE {
    measObjectId            MeasObjectId,
    measObject              CHOICE {
        measObjectNR            MeasObjectNR,
        measObjectEUTRA         MeasObjectEUTRA,
        measObjectUTRA          MeasObjectUTRA,
        measObjectGERAN         MeasObjectGERAN,
        measObjectCDMA2000      MeasObjectCDMA2000,
        measObjectWLAN-r13      MeasObjectWLAN-r13,
        measObjectSL-r14        MeasObjectSL-r14
    }
}
-- ASN1STOP
```

What is claimed:

1. A first apparatus comprising a processor, a memory, and communication circuitry, the first apparatus being capable of connecting to a communications network via its communication circuitry, the first apparatus further comprising computer-executable instructions stored in the memory of the first apparatus which, when executed by the processor of the first apparatus, cause the first apparatus to:
receive, from a second apparatus, a first configuration, the first configuration pertaining to measurements of a first set of beams in one or more cells,
wherein the first configuration comprises a measurement type for beam measurements, a first threshold for a beam-specific measurement result, a second threshold for a cell-specific measurement result, parameters for layer 3 (L3) filtering and measurement reporting criterion,
wherein the measurement type indicates the beam measurements should be performed based on a synchronization signal (SS) block or channel state information reference signal (CSI-RS),
wherein the parameters for L3 filtering include a parameter of a L3 filtering coefficient to be used in a L3 beam filtering and a L3 cell filtering, the L3 filtering coefficient being a parameter k used in: $F_n=(1-a) \cdot F_{n-1}+a \cdot M_n$, and the L3 beam filtering being applied to the first set of beams and the L3 cell filtering being applied to an output of a second set of beams extracted from the first set of beams based on the threshold for beam-specific measurements, and
wherein the second threshold corresponds to a quality threshold of a primary cell to determine if a measurement on other cells is required and configures separate parameters for SS block and CSI-RS; and
receive, from the second apparatus, the SS block or CSI-RS to perform the beam measurements based on the first configuration; and
transmit, to the second apparatus, a measurement report including a cell-specific measurement result of a first cell, the first cell being selected based on the second threshold after the L3 cell filtering.

2. The first apparatus of claim 1, wherein the second threshold is based on a reference signal received power for the primary cell.

3. The first apparatus of claim 2, wherein the second threshold comprises a SS block-based threshold and a CSI-RS based threshold.

4. The first apparatus of claim 1, wherein the measurement report further includes a beam-specific measurement result generated based on the L3 beam filtering.

5. The first apparatus of claim 1, wherein the first configuration further comprises a reporting criterion indicating a plurality of trigger events including a trigger event that an average value or weighted sum of trigger quantity of beams of the primary cell becomes worse than a third threshold.

6. The first apparatus of claim 5, wherein the plurality of trigger events further includes a trigger event that an average value or weighted sum of trigger quantity of beams of a neighbor cell becomes offset better than the primary cell.

7. A second apparatus comprising a processor, a memory, and communication circuitry, the second apparatus being capable of connecting to a communications network via its communication circuitry, the second apparatus further comprising computer-executable instructions stored in the memory of the second apparatus which, when executed by the processor of the second apparatus, cause the second apparatus to:
transmit, to a first apparatus, a first configuration, the first configuration pertaining to measurements of a first set of beams in one or more cells,
wherein the first configuration comprises a measurement type for beam measurements, a first threshold for a beam-specific measurement result, a second threshold for a cell-specific measurement result, parameters for layer 3 (L3) filtering and measurement reporting criterion,
wherein the measurement type indicates the beam measurements should be performed based on a synchronization signal (SS) block or channel state information reference signal (CSI-RS),
wherein the parameters for L3 filtering include a parameter of a L3 filtering coefficient to be used in a L3 beam filtering and a L3 cell filtering, the L3 filtering coefficient being a parameter k used in: $F_n=(1-a) \cdot F_{n-1}+a \cdot M_n$, and the L3 beam filtering being applied to the first set of beams and the L3 cell filtering being applied to an output of a second set of beams extracted from the first set of beams based on the threshold for beam-specific measurements, and
wherein the second threshold corresponds to a quality threshold of a primary cell to determine if a measurement on other cells is required and configures separate parameters for SS block and CSI-RS;
transmit, to the first apparatus, the SS block or CSI-RS to perform the beam measurements based on the first configuration; and
receive, from the first apparatus, a measurement report including a cell-specific measurement result of a first cell, the first cell being selected based on the second threshold after the L3 cell filtering.

8. The second apparatus of claim 7, wherein the second threshold is based on a reference signal received power for the primary cell.

9. The second apparatus of claim 8, wherein the second threshold comprises a SS block-based threshold and a CSI-RS based threshold.

10. The second apparatus of claim 7, wherein the measurement report further includes a beam-specific measurement result generated based on the L3 beam filtering.

11. The second apparatus of claim 7, wherein the first configuration further comprises a reporting criterion indicating a plurality of trigger events including a trigger event that an average value or weighted sum of trigger quantity of beams of the primary cell becomes worse than a third threshold.

12. The second apparatus of claim 11, wherein the plurality of trigger events further includes a trigger event that an average value or weighted sum of trigger quantity of beams of a neighbor cell becomes offset better than the primary cell.

13. A method for a network node, the method comprising:
transmitting, to a first apparatus, a first configuration, the first configuration pertaining to measurements of a first set of beams in one or more cells;
wherein the first configuration comprises a measurement type for beam measurements, a first threshold for a beam-specific measurement result, a second threshold for a cell-specific measurement result, parameters for layer 3 (L3) filtering and measurement reporting criterion,
wherein the measurement type indicates the beam measurements should be performed based on a synchronization signal (SS) block or channel state information reference signal (CSI-RS), wherein the parameters for L3 filtering include a parameter of a L3 filtering coefficient to be used in a L3 beam filtering and a L3 cell filtering, the L3 filtering coefficient being a parameter k used in: $F_n=(1-a) \cdot F_{n-1}+a \cdot M_n$, and the L3 beam filtering being applied to the first set of beams and the L3 cell filtering being applied to an output of a second set of beams extracted from the first set of beams based the threshold for beam-specific measurements, and wherein the second threshold corresponds to a quality threshold of a primary cell to determine if a measurement on other cells is required and configures separate parameters for SS block and CSI-RS;

transmitting, to the first apparatus, the SS block or CSI-RS to perform the beam measurements based on the first configuration; and receiving, from the first apparatus, a measurement report including a cell-specific measurement result of a first cell, the first cell being selected based on the second threshold after the L3 cell filtering.

14. The first apparatus of claim 13, wherein the second threshold is based on a reference signal received power for the primary cell.

15. The first apparatus of claim 14, wherein the second threshold comprises a SS block-based threshold and a CSI-RS based threshold.

16. The first apparatus of claim 13, wherein the measurement report further includes a beam-specific measurement result generated based on the L3 beam filtering.

17. The first apparatus of claim 13, wherein the first configuration further comprises a reporting criterion indicating a plurality of trigger events including a trigger event that an average value or weighted sum of trigger quantity of beams of the primary cell becomes worse than a third threshold.

18. The first apparatus of claim 17, wherein the plurality of trigger events further includes a trigger event that an average value or weighted sum of trigger quantity of beams of a neighbor cell becomes offset better than the primary cell.

* * * * *